US011727513B2

(12) United States Patent
Bayyapu et al.

(10) Patent No.: US 11,727,513 B2
(45) Date of Patent: Aug. 15, 2023

(54) METHOD AND SYSTEM FOR FACILITATING IMPLEMENTATION OF REGULATIONS BY ORGANIZATIONS

(71) Applicant: REGOLOGY, INC., Los Altos, CA (US)

(72) Inventors: Pavan Bayyapu, Cupertino, CA (US); Mukund Goenka, Los Altos, CA (US)

(73) Assignee: Regology, Inc., Palo Alto, CA (US)

( * ) Notice: Subject to any disclaimer, the term of this patent is extended or adjusted under 35 U.S.C. 154(b) by 629 days.

(21) Appl. No.: 15/978,161

(22) Filed: May 13, 2018

(65) Prior Publication Data

US 2018/0330455 A1 Nov. 15, 2018

Related U.S. Application Data

(60) Provisional application No. 62/505,872, filed on May 13, 2017.

(51) Int. Cl.
*G06Q 50/18* (2012.01)
*G06F 40/30* (2020.01)
(Continued)

(52) U.S. Cl.
CPC ........... *G06Q 50/18* (2013.01); *G06F 40/169* (2020.01); *G06F 40/216* (2020.01); *G06F 40/30* (2020.01);
(Continued)

(58) Field of Classification Search
None
See application file for complete search history.

(56) References Cited

U.S. PATENT DOCUMENTS 9,367,851 B2 6/2016 Dale et al.
9,760,556 B1 * 9/2017 Knudson ............... G06F 40/169
(Continued)

FOREIGN PATENT DOCUMENTS

WO WO-2018195198 A1 * 10/2018 ....... G06F 16/24578

OTHER PUBLICATIONS

Federal Register, "Subscription Options and Managing Your Subscriptions," archived by the Internet Archive Wayback Machine on Nov. 21, 2016 (Year: 2016).*

*Primary Examiner* — Jan P Mincarelli
(74) *Attorney, Agent, or Firm* — Cognition IP, P.C.; Edward Steakley; Rajesh Fotedar

(57) ABSTRACT

A method and a server system for facilitating implementation of regulations by organizations is described. Regulations are sourced from data stores associated with a plurality of regulatory authorities to configure a corpus of regulations. A plurality of enriched regulations is generated from the corpus of regulations. A user is enabled to create a construct related to at least one of an organization and an industry associated with the user. The construct is indicative of corresponding functional constituents and relationships among the functional constituents. Search and discovery of one or more regulations applicable to the organization or the industry is facilitated. Subsequent to the discovery of the one or more regulations, a linking of clauses of a respective enriched regulation to at least one functional constituent of the construct is enabled for facilitating implementation of the one or more regulations applicable to the organization or the industry associated with the user.

19 Claims, 12 Drawing Sheets

(51) Int. Cl.
  *G06F 40/49*   (2020.01)
  *G06F 40/169*  (2020.01)
  *G06F 40/216*  (2020.01)
  *G06Q 50/26*   (2012.01)
  *G06Q 30/018*  (2023.01)

(52) U.S. Cl.
  CPC .......... *G06F 40/49* (2020.01); *G06Q 30/018* (2013.01); *G06Q 50/26* (2013.01)

(56) References Cited

U.S. PATENT DOCUMENTS

| | | | |
|---|---|---|---|
| 10,922,621 B2* | 2/2021 | Buccapatnam Tirumala .............. | G06K 9/629 |
| 2002/0188611 A1* | 12/2002 | Smalley .................. | G06Q 10/10 |
| 2003/0110070 A1 | 6/2003 | De Goeij | |
| 2007/0185758 A1 | 8/2007 | Gibson et al. | |
| 2011/0313952 A1 | 12/2011 | Agam | |
| 2016/0307286 A1 | 10/2016 | Miasnik et al. | |
| 2017/0228655 A1* | 8/2017 | Alarie ................... | G06Q 10/10 |
| 2018/0053128 A1* | 2/2018 | Costas .................. | G06Q 50/18 |
| 2018/0075554 A1* | 3/2018 | Clark .................... | G06Q 50/18 |

* cited by examiner

METHOD AND SYSTEM FOR FACILITATING IMPLEMENTATION OF REGULATIONS BY ORGANIZATIONS

TECHNICAL FIELD

The present disclosure generally relates to regulations applicable to a wide variety of organizations, and more particularly, to a method and system for facilitating implementation of regulations by organizations.

BACKGROUND

A regulatory authority, also referred to as a regulatory agency, regulatory body or regulator, is a public authority or government agency responsible for exercising autonomous authority over some area of human activity in a regulatory or supervisory capacity. For example, the Securities and Exchange Commission (SEC) and the Commodity Futures Trading Commission (CFTC) provide regulatory oversight for financial markets. In another illustrative example, the U.S. Food and Drug Administration (FDA) regulates a wide range of products, including foods except for aspects of some meat, poultry and egg products, which are regulated by the U.S. Department of Agriculture. The regulations put forth by the regulatory authorities subject the corresponding businesses to certain requirements, restrictions and guidelines with an aim to maintain the integrity of the industries or businesses associated therewith.

Most businesses are subject to diverse set of regulations and the businesses have to use internal resources or a hybrid of internal efforts and assistance from experts/consultants to implement the regulations. Existing solutions do not enable discovery of all regulations for a business/industry in one place. Conventional discovery solutions typically show regulations of one jurisdiction or industry or market. Moreover, conventional regulatory assistance solutions either do not include features for collaboration or if they do, the collaboration tools are not tied to the regulations. For example, blogs, articles, annotations by industry experts are not directly connected to the underlying regulations making it difficult for the reader to comprehend the underlying regulation and the commentary associated with it.

Moreover, in today's Governance, Risk and Compliance (GRC) solutions, there are processes to ensure tracking of compliance related activities to mitigate the identified risks, but those processes are not tied back to actual clauses from regulations on the GRC platform itself. Hence, if the regulation changes or the business changes, it becomes very tedious and expensive for the organization to make those updates.

Accordingly, there is a need to enable an end-user entity, such as an organization, to discover all relevant regulations in one place. Moreover, there is a need to enable the end-user entity to collaborate and build consensus on a regulation by asking questions or discussing with the community. Furthermore, there is need to add context to the regulations and connect the regulations to industries or businesses to facilitate current and future implementation of the regulations.

SUMMARY

Various embodiments of the present disclosure provide methods, server systems, and computer program products for facilitating implementation of regulations by organizations.

In an embodiment, a method for facilitating implementation of regulations is disclosed. The method includes sourcing, by a server system, regulations from data stores associated with a plurality of regulatory authorities to configure a corpus of regulations. The method includes generating, by the server system, a plurality of enriched regulations from the corpus of regulations. An enriched regulation is generated by parsing a regulation from among the corpus of regulations and associating parsed components of the regulation with relevant context. The method includes enabling a user, by the server system, to create a construct related to at least one of an organization and an industry associated with the user. The construct related to at least one of the organization and the industry is indicative of corresponding functional constituents and relationships among the functional constituents. The method includes facilitating, by the server system, search and discovery of one or more regulations applicable to at least one of the organization and the industry associated with the user. The method includes enabling by the server system subsequent to the discovery of the one or more regulations, a linking of clauses of a respective enriched regulation to at least one functional constituent of the construct for facilitating implementation of the one or more regulations applicable to at least one of the organization and the industry associated with the user.

In another embodiment, a server system for facilitating implementation of regulations is disclosed. The server system includes at least one processing module and a memory having stored therein machine executable instructions. The stored machine executable instructions when executed by the at least one processing module cause the server system to source regulations from data stores associated with a plurality of regulatory authorities to configure a corpus of regulations. The server system is caused to generate a plurality of enriched regulations from the corpus of regulations. An enriched regulation is generated by parsing a regulation from the corpus of regulations and associating parsed components of the regulation with relevant context. The server system is caused to enable a user to create a construct related to at least one of an organization and an industry associated with the user. The construct related to at least one of the organization and the industry is indicative of corresponding functional constituents and relationships among the functional constituents. The server system is caused to facilitate search and discovery of one or more regulations applicable to at least one of the organization and the industry associated with the user. Subsequent to the discovery of the one or more regulations, the server system is caused to enable a linking of clauses of a respective enriched regulation to at least one functional constituent of the construct for facilitating implementation of the one or more regulations applicable to at least one of the organization and the industry associated with the user.

In yet another embodiment, a computer program product comprising at least one computer-readable storage medium for facilitating implementation of regulations is disclosed. The computer-readable storage medium includes a set of instructions, which, when executed by one or more processors, cause an electronic device to at least source regulations from data stores associated with a plurality of regulatory authorities to configure a corpus of regulations. The electronic device is caused to generate a plurality of enriched regulations from the corpus of regulations. An enriched regulation is generated by parsing a regulation from the corpus of regulations and associating parsed components of the regulation with relevant context. The electronic device is caused to enable a user to create a construct related to at least one of an organization and an industry associated with the user. The construct related to at least one of the organization and the industry is indicative of corresponding functional constituents and relationships among the functional constituents. The electronic device is caused to facilitate search and discovery of one or more regulations applicable to at least one of the organization and the industry associated with the user. Subsequent to the discovery of the one or more regulations, the electronic device is caused to enable a linking of clauses of a respective enriched regulation to at least one functional constituent of the construct for facilitating implementation of the one or more regulations applicable to at least one of the organization and the industry associated with the user.

Other aspects and example embodiments are provided in the drawings and the detailed description that follows.

BRIEF DESCRIPTION OF THE FIGURES

For a more complete understanding of example embodiments of the present invention, reference is now made to the following descriptions taken in connection with the accompanying drawings in which.

Figure 1:
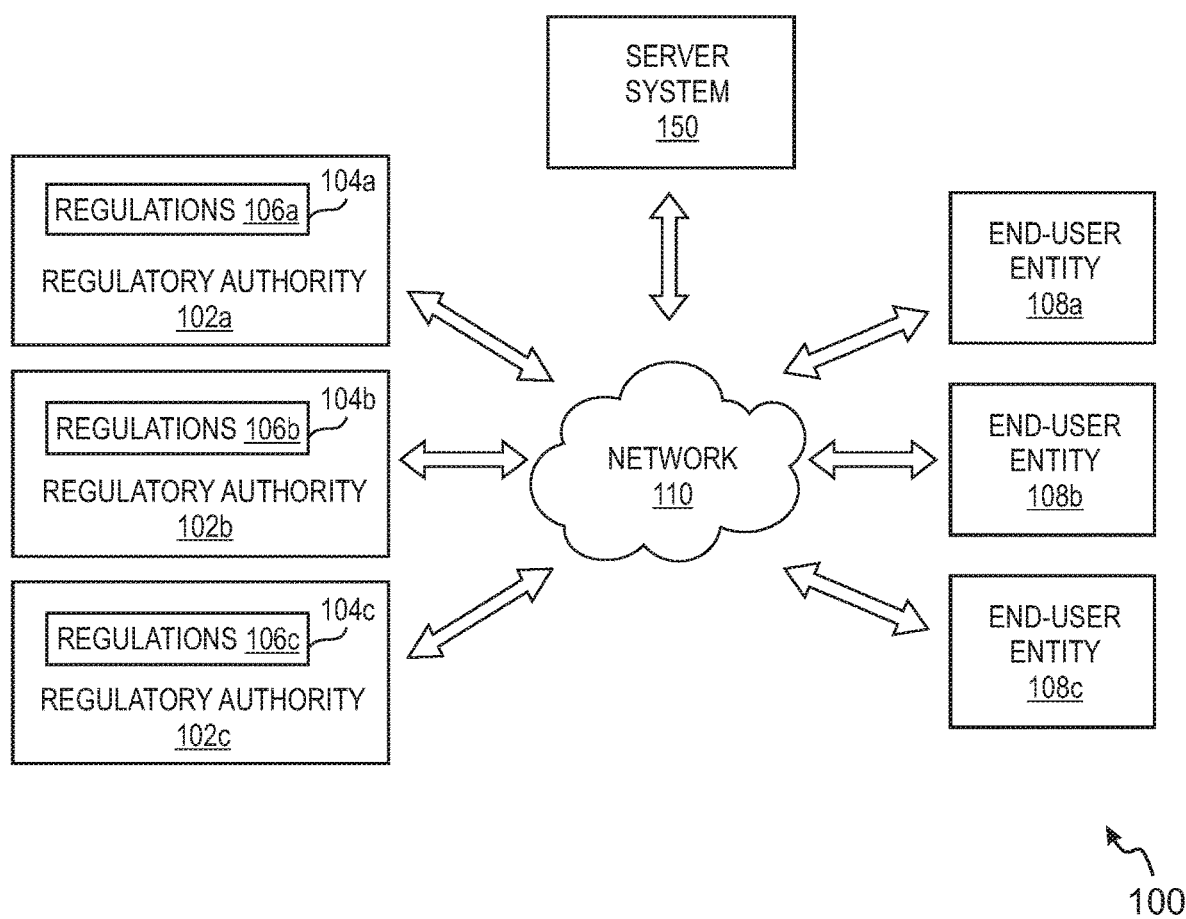
FIG. 1 illustrates a simplified representation of an environment in which various embodiments of the present invention may be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present invention. It will be apparent, however, to one skilled in the art that the present invention can be practiced without these specific details.

Reference in this specification to "one embodiment" or "an embodiment" means that a particular feature, structure, or characteristic described in connection with the embodiment is included in at least one embodiment of the present invention. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the present invention is set forth without any loss of generality to, and without imposing limitations upon, the present invention.

Overview

The present invention provides a method and system for facilitating implementation of regulations by organizations.

In one embodiment, a server system for facilitating implementation of regulations by organizations is disclosed. The server system, also interchangeably referred to herein as a 'system', is configured to source regulations from data stores associated with a plurality of regulatory authorities to configure a corpus of regulations. The server system uses various natural language processing (NLP) and AI algorithms to filter the regulations and, thereafter add context to the regulations to generate enriched regulations. The filtered context-aware regulations, i.e. the enriched regulations, make it easier for users to work with regulations. The server system also allows for very specific topic-based discussions and blogging amongst the user community. The easy to understand regulations along with associated commentary from the user community helps organizations understand themselves from a regulatory perspective.

The server system enables users to search and discover all regulations related to an industry or an organization in one place. Moreover, the server system allows the user to distill the organization or the industry down to its most granular parts, and then link each part to the most granular clauses of a regulation. The linking of clauses of applicable regulations to functional constituents (for example, businesses, products, etc.) of an organization or an industry is performed online and saved on the organization's cloud. This significantly reduces the regulatory and compliance costs of an organization—allowing the organization to be nimble when changes occur and increases the level of compliance across the organization.

FIG. 1 shows a simplified representation of an environment 100 in which various embodiments of the present invention may be practiced.

The environment 100 is depicted to include a plurality of regulatory authorities, such as regulatory authority 102a, 102b and 102c. Each regulatory authority may be entrusted with ensuring regulatory compliance for their respective industries. For example, a regulatory authority may be entrusted with ensuring regulatory compliance for financial institutions. Another regulatory authority may be entrusted with ensuring regulatory compliance for institutions related to public health and safety. Yet another regulatory authority may be entrusted with ensuring regulatory compliance for pharmaceutical products and so on and so forth. For ensuring regulatory compliance, the regulatory authorities issue regulations, which the businesses have to adhere to. Accordingly, in FIG. 1, each regulatory authority is depicted to be associated with a data store storing respective regulations, such as for example, the regulatory authority 102a is depicted to be associated with a data store 104a storing regulations 106a, the regulatory authority 102b is depicted to be associated with a data store 104b storing regulations 106b, and the regulatory authority 102c is depicted to be associated with a data store 104c storing regulations 106c. The regulations put forth by the regulatory authorities subject the organizations to certain requirements, restrictions and guidelines with an aim to maintain the integrity of the industries or businesses associated therewith.

FIG. 1 further depicts various entities that either implement the regulations or assist in implementation of the regulations, in form of end-user entities, such as end-user entity 108a, end-user entity 108b and end-user entity 108c. In an illustrative example, an end-user entity may be an organization (for example, a business enterprise). In another illustrative example, the end-user entity may be a publishing company involved in publishing articles, blogs etc. on the regulations. In yet another illustrative example, the end-user entity may be an individual, such as an industry expert or a consultant, who assists business enterprises in implementing appropriate regulations. Typically, the various end-user entities 108a-c access online forums or Websites associated with the regulatory authorities over a communication network, such as a network 110, to learn and implement the regulations. The network 110 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or ZigBee networks, and the like. An example of the combination of wired and wireless networks may include the Internet or a Cloud-based network.

It is understood that most organizations are subjected to a diverse set of regulations and, typically, organizations have to access a variety of sources to discover all regulations applicable for their respective entities. Moreover, currently, organizations are unable to discuss/debate, or in general collaborate, with other organizations or with industry experts/consultants to better understand the regulations. Moreover, organizations are having difficulty in relating various clauses of regulations to their specific business structure. Accordingly, FIG. 1 depicts a server system 150, which is capable of overcoming the drawbacks of the conventional systems and providing additional advantages.

The server system 150 is capable of enabling an end-user entity in discovering all applicable regulations in one place. Further, the server system 150 provides a platform to end-user entities to collaborate and build consensus on a regulation by asking questions or discussing with the community. The server system 150 also enables the end-user entities to add annotations to the regulations and connect the regulations to their respective industries or businesses to facilitate current and future implementation of regulations. As such, the server system 150 facilitates in implementation of regulations by organizations. The server system 150 may be accessible to the end-user entities 108 a-c over the network 110. The server system 150 is explained in further detail with reference to FIG. 2.

Figure 2:
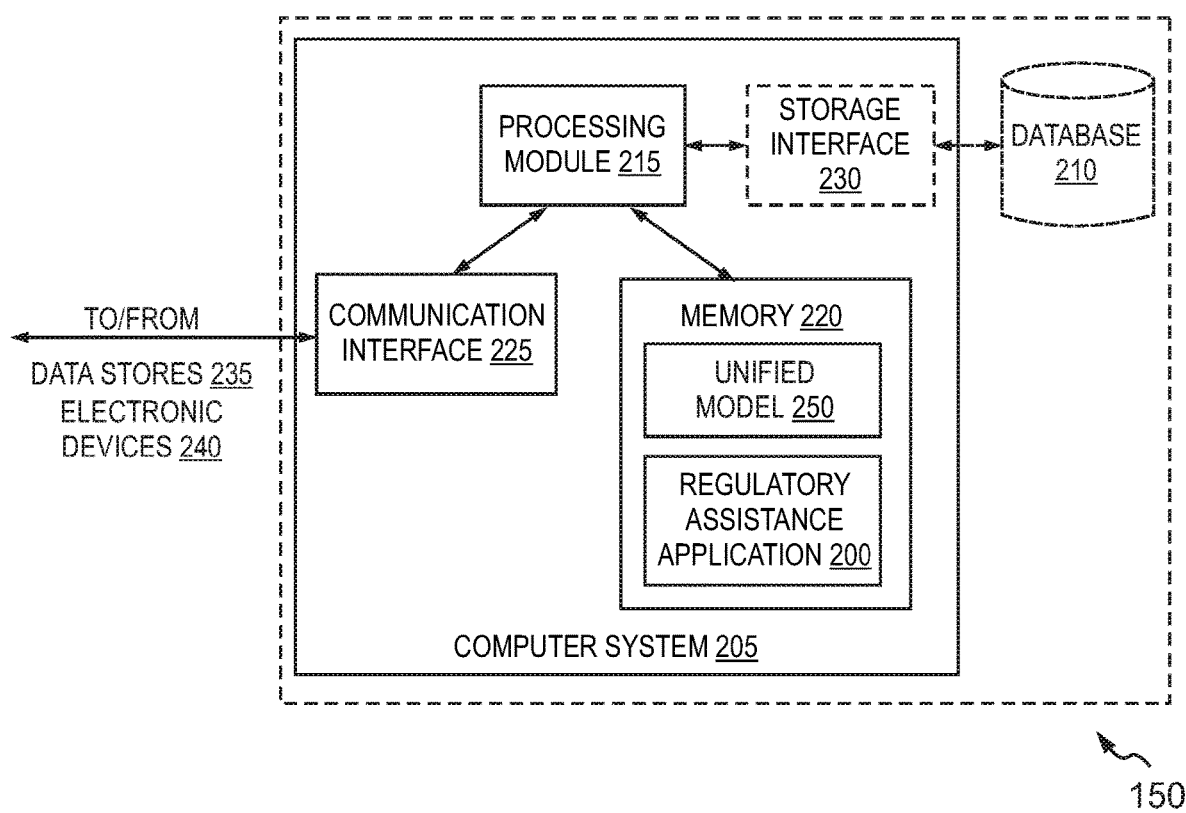
FIG. 2 is a block diagram of a server system of FIG. 1, in accordance with an example embodiment of the invention.

FIG. 2 is a block diagram of the server system 150 of FIG. 1, in accordance with an example embodiment of the invention. The server system 150 is configured to facilitate implementation of regulations by organizations. The term 'facilitate implementation of regulations' as used herein implies enabling an end-user entity to (1) discover all applicable regulations; (2) understand the applicable regulations either through context-based enrichment or through collaboration with other users, and (3) connect the granular clauses of the regulations to the concerned aspects of the businesses, so as to enable the end-user entity to fully estimate the impact of all applicable regulations and thereafter take appropriate action to implement the regulations to achieve regulatory compliance. The term 'organization' as used herein may relate to any private enterprise, public enterprise, private-public partnership (PPP) enterprise, non-governmental organization, non-profit organization, and the like. For example, the organization may be a banking enterprise, an educational institution, a financial trading enterprise, an aviation company, a consumer goods enterprise or any such public or private sector enterprise.

In at least one example embodiment, the server system 150 may be embodied as a cloud-based platform capable of being accessed over a network, such as the network 110 explained with reference to FIG. 1. The cloud-based platform may provision regulatory assistance services as a Web service accessible through a Website or a Web portal. In such a scenario, the end-user entities, such as the end-user entities 108a-108c, may access the Website over the network 110 using Web browser applications installed in their respective electronic devices and thereafter use the regulatory assistance services for either implementing applicable regulations for themselves or facilitating organizations in implementing the applicable regulations. The end-user entities, such as the end-user entities 108a-108c are hereinafter referred to as users for purposes of the description.

The server system 150 includes a computer system 205 and a database 210. The computer system 205 includes at least one processing module 215 for executing instructions. Instructions may be stored in, for example, but not limited to, a memory 220. The processing module 215 may include one or more processing units (e.g., in a multi-core configuration). In an embodiment, the processing module 215 may be embodied as a multi-core processor, a single core processor, or a combination of one or more multi-core processors and one or more single core processors. For example, the processing module 215 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing module 215 may be configured to execute hard-coded functionality. In an embodiment, the processing module 215 is embodied as an executor of software instructions, wherein the instructions may specifically configure the processing module 215 to perform the algorithms and/or operations described herein when the instructions are executed.

In at least one example embodiment, the memory 220 is configured to store a regulatory assistance application 200. The processing module 215 is configured to execute the instructions associated with the regulatory assistance application 200 stored in the memory 220 to facilitate implementation of regulations by organizations. More specifically, the processing module 215 is configured to facilitate discovery of regulations, user-collaboration on regulations, and in connecting industry/company functional constituents to the clauses of regulations, as will be explained in detail with reference to FIGS. 3 to 7B.

Further, the memory 220 is configured to store a unified model 250, which is executed by the processing module 215 to generate an enriched corpus of regulations as will be explained later with reference to FIG. 3. The memory 220 may be embodied as one or more volatile memory devices, one or more non-volatile memory devices, and/or a combination of one or more volatile memory devices and non-volatile memory devices. For example, the memory 220 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semi-conductor memories (such as mask ROM, PROM (programmable ROM), EPROM (erasable PROM), flash memory, RAM (random access memory), etc.).

In at least one example embodiment, the users may request the server system 150 to provision access to the regulatory assistance application 200 over the network 110. The instances of the regulatory assistance application 200 may thereafter be downloaded on the electronic devices of the respective users in response to their request for access to the regulatory assistance application 200. In some embodiments, the memory 220 supports an installer for the regulatory assistance application 200. The installer of the regulatory assistance application 200 may be configured to enable a user to download an instance of the regulatory assistance application 200 from the server system 150 into the electronic device associated with the user.

Alternatively, in some embodiments, the regulatory assistance application 200 may be factory installed within the electronic devices associated with the users and, as such, the users may not need to explicitly request the regulatory assistance application 200 from the server system 150 for implementing regulations within their respective organizations. The regulatory assistance application 200 downloaded onto an electronic device may enable the respective user to establish a user account with the server system 150. Further, the regulatory assistance application 200 may be configured to provide various UIs enabling the user to use the various features provided by the server system 150 such as features related to discovering regulations, collaborating on regulations, connecting regulations to organization/industry constructs, and the like.

The processing module 215 is operatively coupled to a communication interface 225 such that the computer system 205 is capable of communicating with data stores 235 hosting data related to the regulations (for example, Websites and/or online forums associated with regulatory authorities, such as U.S. government or other public or private regulatory authorities), electronic devices 240 associated with users (such as workstation or network terminals of businesses/publishing houses, personal computing devices of experts, consultants, etc.), and the like. The processing module 215, in conjunction with the communication interface 225, is configured to provision instances of the regulatory assistance application 200 to the electronic devices 240 for installation and use the regulatory assistance application 200 as a service, upon request.

The database 210 is any computer-operated hardware suitable for storing and/or retrieving data, such as, but not limited to, plurality of regulations. The database 210 may include multiple storage units such as hard disks and/or solid-state disks in a redundant array of inexpensive disks (RAID) configuration. The database 210 may include a storage area network (SAN) and/or a network attached storage (NAS) system. In some embodiments, the database 210 is integrated within the computer system 205. For example, the computer system 205 may include one or more hard disk drives as the database 210. In other embodiments, the database 210 is external to the computer system 205 and may be accessed by the computer system 205 using a storage interface 230. The storage interface 230 is any component capable of providing the processing module 215 with access to the database 210. The storage interface 230 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processing module 215 with access to the database 210.

In one embodiment, the database 210 is configured to store raw data corresponding to regulations downloaded/extracted from the data stores 235 related to a plurality of regulatory authorities. The raw data sourced from the data stores 235 is also referred to herein as the corpus of regulations. The database 210 further stores the output of filtering and enrichment operations performed on the corpus of regulations. More specifically, the database 210 stores a plurality of enriched regulations. The database 210 also stores information related to accounts created by various users, such as for example, end-user entities 108a-c shown in FIG. 1. The information related to the accounts may include, but is not limited to, data related to the user account, applicable enriched regulations, data related to collaboration among end-user entities, and the like. In addition to the information related to the accounts, the database 210 may be also store information related to various organizations.

In at least one example embodiment, the processing module 215 of the server system 150 is configured to source regulations from the data stores 235 associated with a plurality of regulatory authorities to configure a corpus of regulations. For example, the processing module 215 may extract a large number of regulations from network entities, such as Web servers and other public and private data stores storing regulations put forth by various regulatory authorities. In an illustrative example, the processing module 215 may download a one-time corpus of regulations from various U.S. government Websites and update the corpus of regulations daily or quarterly, as available. It is noted the regulations are downloaded only subsequent to their appropriate copyright and legal review ensuring no copyright or legal boundaries are violated.

Further, the processing module 215 is configured to use the unified model 250 stored in the memory 220 to process the regulations and generate a plurality of enriched regulations. The plurality of enriched regulations enables: (1) search and discovery of regulations, (2) collaboration among users to facilitate understanding of regulations, and (3) linking of regulations to functional constituents of an organization/industry to facilitate implementation of the regulations. The unified model 250 is associated with proprietary Natural Language Processing (NLP) and Artificial Intelligence (AI) algorithms to decompose and 'filter' the corpus of regulations. Further, the unified model 250 is associated with another set of rules and algorithms configured to 'enrich' the corpus or, in other words, to add deeper context to the filtered corpus of regulations. The 'filtering' and the 'enrichment' of the corpus of the regulations by the processing module 215 using the unified model 250 is further explained with reference to FIG. 3.

Figure 3:
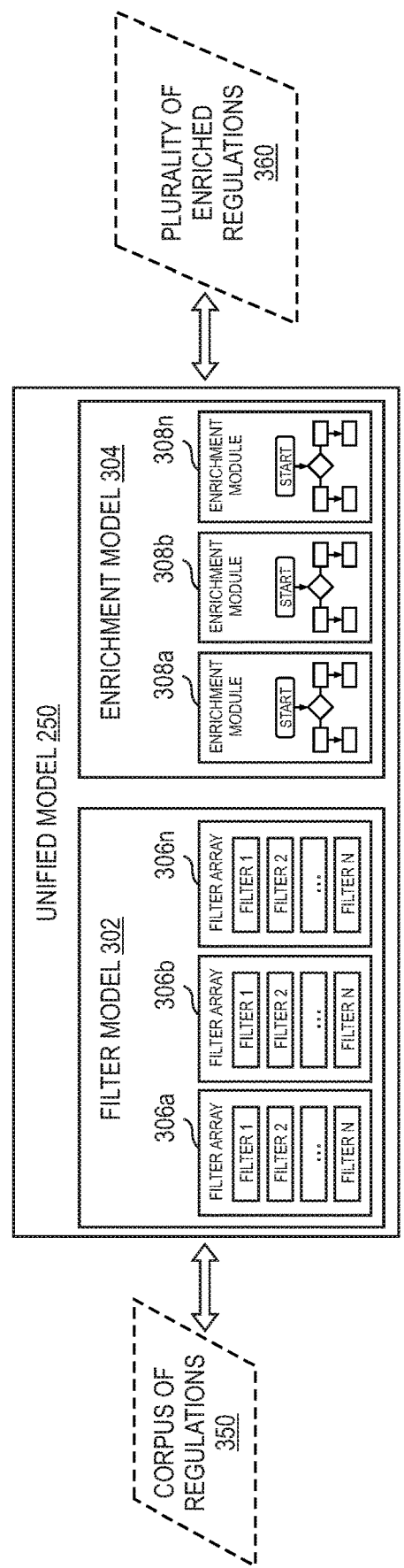
FIG. 3 shows an example representation of components of a unified model for facilitating generation of a plurality of enriched regulations, in accordance with an example embodiment of the invention.

FIG. 3 shows an example representation of components of the unified model 250 for facilitating generation of a plurality of enriched regulations, in accordance with an example embodiment of the invention.

As explained with reference to FIG. 2, the unified model 250 includes a plurality of NLP and AI algorithms that enable filtering and enrichment of the corpus. Accordingly, the unified model 250 is depicted to include a filter model 302 and an enrichment model 304.

The filter model 302 is configured to perform pre-processing of the data corresponding to the corpus of regulations to remove 'noise' (or unwanted information) in the data and normalize the information based on the corpus and a feedback from earlier enrichments. To that effect, the filter model 302 is depicted to include a plurality of filter arrays, such as filter array 306a, filter array 306b and filter array 306n. Each filter array is associated with appropriate proprietary NLP and AI algorithms to perform one pre-processing operation (i.e. a filtering operation) on the corpus of regulations. Some non-exhaustive examples of pre-processing operations for noise removal and normalization include tokenization operation, de-numeration operation, and the like. The tokenization operation involves removal of white spaces/blank spaces, line spaces, line breaks, as well as HTML/XML/Unicode and other metatags/encodings, in order to produce lists of words and punctuations. The de-numeration operation involves decoupling of all regulatory numbering schemes and identifiers and converting regulations into arrays of texts. It is noted that such conversion maintains identification back to regulation sections within the arrays. The filter arrays are further configured to perform following operations: (1) isolate all acronyms, dates, and definition words; (2) convert the word list into lower case words and build vocabulary, (3) sort the list of words and hold in the memory 220; (4) identify the most common and least common word patterns and match the common words; (5) identify the stems of words, i.e., identify the dictionary words and ignore plurals, verb tenses, etc.; and (6) identify sentences and phrases.

The enrichment model 304 consists of 'parsing rules' and 'association rules'. These rules are constantly improved based on machine learning and/or manual feedback. The enrichment model 304 is depicted to include a plurality of enrichment modules, such as enrichment module 308a, enrichment module 308b and enrichment module 308n. Each enrichment module is associated with appropriate parsing and association rules to perform one enrichment operation on decomposed corpus of regulations. Some non-exhaustive examples of operations performed may include (1) parsing and identifying each regulation's granular divisions and sub-divisions, such as title, part, sub-part, chapter, section, etc.; (2) parsing and dynamically identifying links to other regulations, definitions, dates, abbreviations, agency associated with the regulation, jurisdiction; (3) parsing and identifying links related to regulatory repositories across states and countries (such as, but not limited to, U.S. based repositories related to the Federal Register (FR), Code of Federal Regulations (CFR), United States Code (USC), and the like), and also across unions (such as for example, the European Union); and (4) parsing and identifying action verbs, calculations, compliance words, actors, timeline and triggers for those timelines, reporting requirements, and the like.

In an illustrative example, a portion of the regulation § 800.103 includes textual content "(a) Except as provided in paragraph (b) of this section and otherwise in this part, the regulations in this part apply from the effective date (as defined in Section 800.210)". In such a case, the term '§ 800.210 Effective date' may be parsed and associated with or linked with "The term effective date means Dec. 22, 2008" to enrich the regulation.

In at least one example embodiment, the enrichment of the decomposed corpus may further include adding context to the regulations. For example, the enrichment modules are configured to add deeper context that connects the data to other relevant regulatory clauses—definitions, deadlines, examples, references, actors, agencies, reports and other related regulatory clauses (for example, a subsequent version of the regulation published by the government agency). Furthermore, the same decomposed corpus may also be exposed to other generic datasets—generic industry and product lists (for example, North American Industry Codes Standard (NAICS) or North American Product Codes Standard (NAPCS)) to further deepen the regulation's context.

Accordingly, the FIG. 3 depicts the corpus of regulations 350 being provisioned to the unified model 250 as the input and the unified model 250 subsequent to filtering and enrichment of the corpus of regulations 350 generates the enriched context-aware regulations, shown as a plurality of enriched regulations 360 as output. It is noted that the processing module 215, in conjunction with the unified model 250 (i.e. the various NLP/AI algorithms and parsing/association rules) stored in the memory 220 is configured to perform the processing of the corpus of regulations 350 to generate the plurality of enriched regulations 360. It is noted that in some embodiments, the server system 150 is also configured to include a mechanism to store relevant customized datasets that can be uploaded by the users for pre-processing. This allows the user to create their own custom version of decomposed/enriched regulation.

The context-aware regulations, generated in such a manner, may now be presented to an end user for their interpretation, providing multiple options that the user may not have otherwise thought about. This helps with the "search and discovery" of regulations. More specifically, the server system 150 enables a user to not only search for specific regulations that the user is aware of, but also discover regulations that may be applicable to the organization/industry associated with the user that the user is not aware of. As explained above the term 'user' is used interchangeably with an end-user entity and may refer to an individual within the organization tasked with implementing the applicable regulations for the organization, or, any individual (such as a consultant, contractor, etc.) capable of assisting organizations in implementing the applicable regulations. An example user interface presented to a user for facilitating search and discovery of regulations is shown in FIG. 4.

Figure 4:
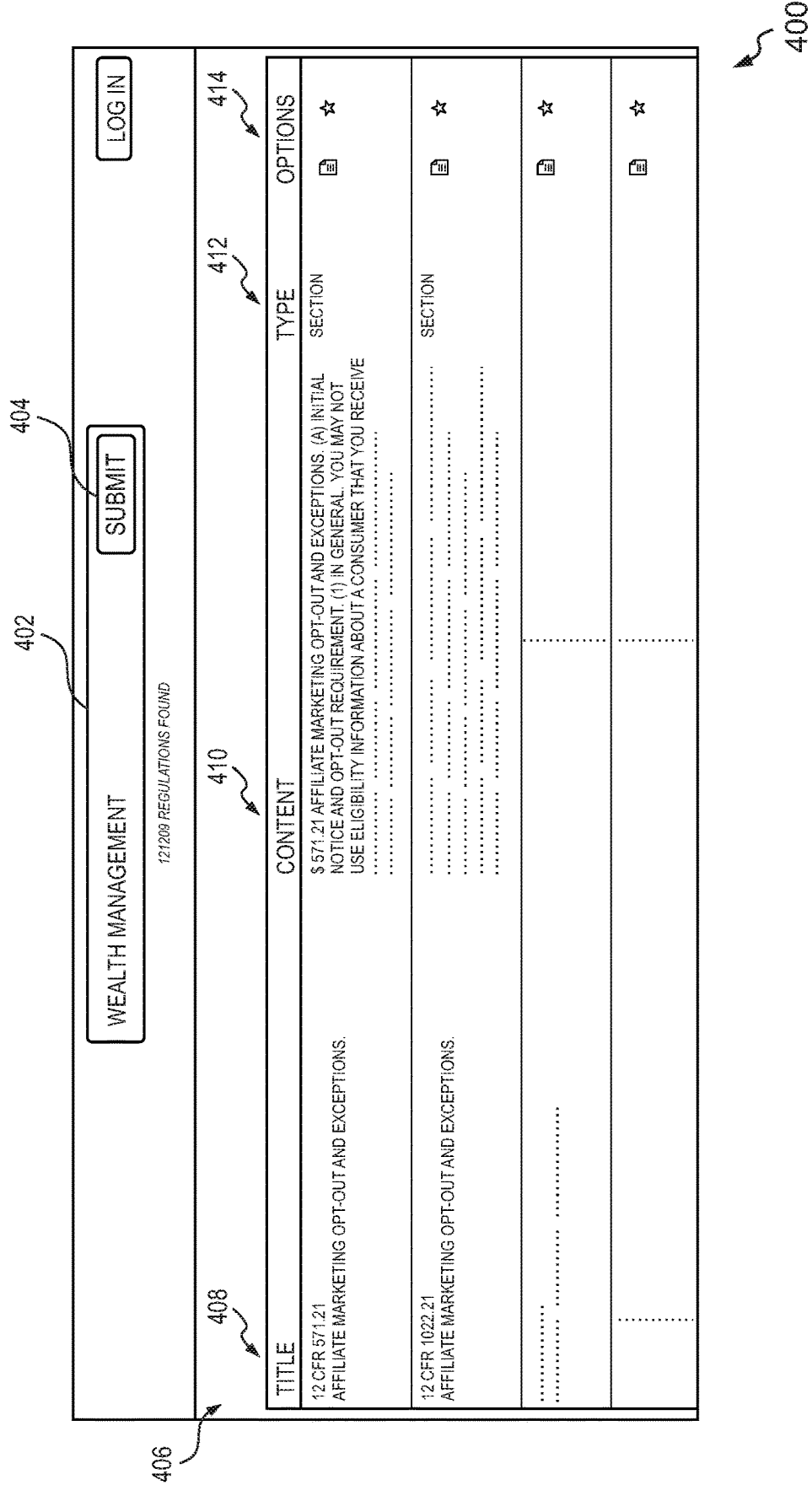
FIG. 4 shows a representation of a User Interface (UI) presented to a user by the server system of FIG. 1 for facilitating search and discovery of regulations, in accordance with an example embodiment of the invention.

FIG. 4 shows a representation of a User Interface (UI) 400 presented to a user by the server system 150 of FIG. 1 for facilitating search and discovery of regulations, in accordance with an example embodiment of the invention.

As explained with reference to FIG. 2, the server system 150 may be embodied as an online portal capable of providing regulatory assistance as a Web service over a network, such as the Internet. The online portal may be embodied as a Website. It is noted that in some embodiments, the regulatory assistance may be extended by the server system 150 using an application, referred to herein as the regulatory assistance application 200 (shown in FIG. 2), capable of being downloaded and installed on the user's electronic device. The Website or the regulatory assistance application 200 may be associated with UIs capable of assisting users with discovery of regulations, collaboration on the regulations with other users, creation of industry/organization constructs and connection of appropriate regulations to the industry/organization constructs. One such UI associated with the Website (or the regulatory assistance application 200) capable of enabling search and discovery of regulations is shown as the UI 400 in FIG. 4.

The UI 400 depicts a search box 402 capable of receiving user input. The user is exemplarily depicted to have typed 'WEALTH MANAGEMENT' in the search box 402 and selected the submit option 404 located within the search box 402. The UI 400 further depicts a list of regulations that are related to wealth management as shown in a portion 406. More specifically, the portion 406 depicts a column 408 showing title of the regulation, a column 410 showing corresponding content, a column 412 showing a type of regulation and a column 414 providing options to view the regulation and/or add the regulation to favorites.

The search box 402 displayed on the UI 400 is capable of enabling the user to not only search for a specific regulation related to the user' organization or industry, but also discover all regulations related to a specific industry (such as 'Wealth Management' for instance). As explained with reference to FIG. 2, the processing module 215 of the server system 150 is configured to source regulations from a plurality of data stores associated with regulatory authorities to configure a corpus of regulations. The corpus of regulations stored in the database 210 serves as a one-stop store for all the regulations that may be applicable for an organization/industry associated with the user. The corpus of regulations precludes the need for the user to identify various sources for retrieving regulations and thereafter determine applicability of the regulations to the respective organization/industry. Further, the decomposition and enrichment of corpus of regulations enables discovery of all relevant regulations. Accordingly, the user input 'Wealth management' in the search box 402 results in retrieval of all regulations including not only the word 'Wealth' and 'Management', but also those results, which are enriched with context and annotated as related to 'Wealth Management' either by the processing module 215 of the server system 150 (shown in FIG. 1), or by other users of the regulatory assistance service offered by the server system 150.

In addition to facilitating discovery of the regulations, the server system 150 is also configured to facilitate active collaboration on the regulations. For example, a user can share with other users their version of datasets, custom decomposed/enriched regulations, their research, blogs and annotations. Moreover, the user can also ask a question or answer other people's questions on one or more underlying regulations. In some example embodiments, multiple users can create an "existence" on the server system 150. More specifically, the server system 150 provides functionality for a user to add to their favorites a regulation, agency or another user, allowing that user to instantly view blogs and updates posted about the items they are interested in.

As shown in FIG. 4, the server system 150 enables users to annotate any regulation (for example, using an option provided in the column 414 on the UI 400) and for others to easily find those annotations. Moreover, the processing module 215 is configured to enable users to track relevant content like most useful and popular annotations, blogs, whitepapers, by tagging the content. The server system 150 also allows users to enter into a subscription-based relationship with other users for viewing of copyrighted annotations. Furthermore, the server system 150 allows for multiple levels of users and authentication, providing a flexible structure to suit the collaborative ecosystems in which most organizations work with other organizations—clients, counterparties, vendors, professional services firms, government agencies, and the like.

It is noted that the regulatory assistance service as offered by the server system 150 provides a collaboration platform for all regulations unlike conventional solutions which are either fragmented or offer topic specific blogging platforms. Moreover, large publishing companies bring in experts to annotate regulations from a particular agency (such as for example, for IRS Tax rules), which they then offer to enterprise subscribers for substantial fees. The server system 150 provides a single publicly available online source for annotations and meaningful insights around all regulations, across all industries and markets.

The collaboration among users, experts, consultants enable tying the appropriate commentary to the regulations, thereby facilitating better understanding of the regulations. The user may then create organization/industry level constructs to enable current and future implementations of the regulations. The creation of organization/industry level constructs is explained hereinafter.

In addition to facilitating discovery of the regulations, the server system 150 is also configured to enable a user to create a framework that allows mapping of all aspects of a corresponding industry or an organization that are relevant subjects for regulations. More specifically, the server system 150 enables the user to create a construct related to at least one of organization or industry associated with the user. The construct related to an organization is referred to herein as an 'organization level construct', whereas the construct related to the industry is referred to herein as the 'industry level construct'. Each construct is composed of respective functional constituents and interconnections among the functional constituents. For example, a list of all products relevant to an industry (product families, products, sub-products) can be identified and listed along with a hierarchy within those products as a functional constituent 'Products'. In this example, the entire product hierarchy is called a 'Node' while one sub-product within the hierarchy is called a 'Node element'. Similarly, processes, functional areas, roles, compliance areas, players in the industry, typical IT systems, and the like, may also be listed in the hierarchy or as one-off objects.

Furthermore, the server system 150, through the processing module 215, allows users to establish relationships across these functional constituents. The links are referred to herein as 'Industry link' or 'Organization link'. For example, in an organization, a particular sub-product is processed using a particular transaction processing system, needs specific functional areas and roles & responsibilities to process the product, and particular compliance tracking processes. All these relationships would be 'organization links'. Example representations of the industry level constructs and organization level constructs along with corresponding industry links and organization links are depicted in FIGS. 5A and 5B.

Figure 5A:
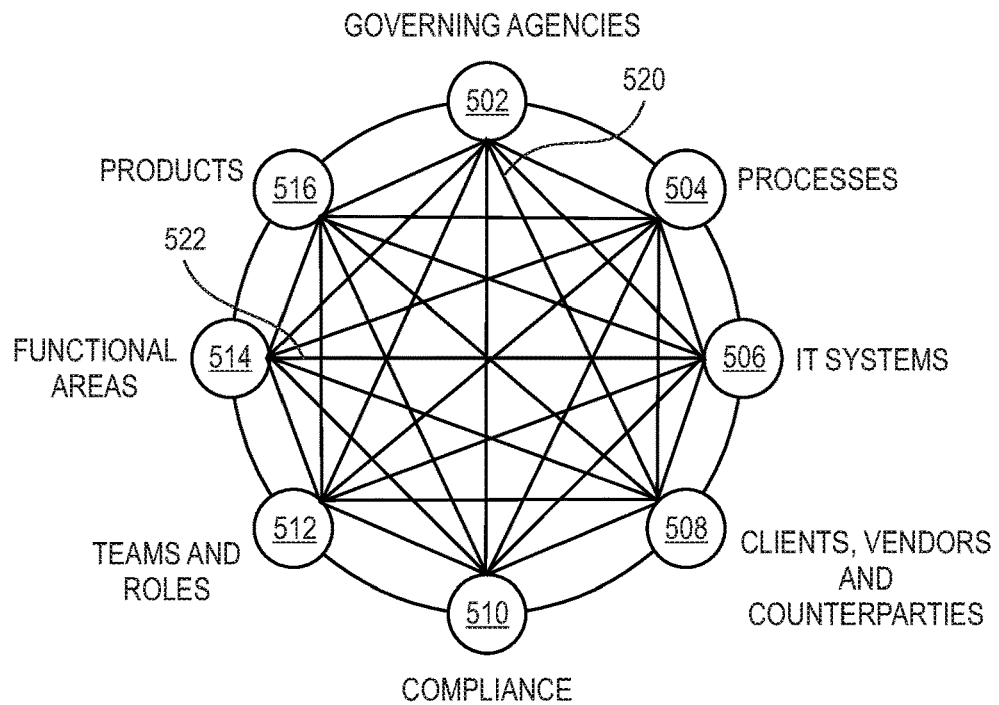
FIG. 5A shows a simplified representation of an industry level construct, in accordance with an example embodiment of the invention.
Figure 5B:
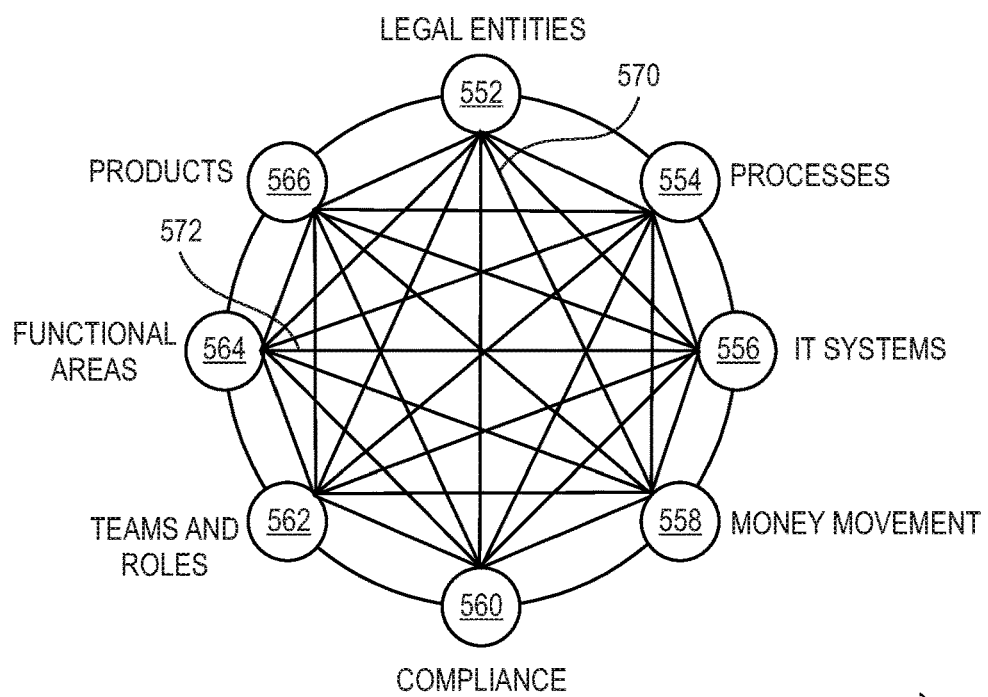
FIG. 5B shows a simplified representation of an organization level construct, in accordance with an example embodiment of the invention.

FIG. 5A shows a simplified representation of an industry level construct 500, in accordance with an example embodiment of the invention. FIG. 5B shows a simplified representation of an organization level construct 550, in accordance with an example embodiment of the invention.

In one embodiment, a user (i.e. an end-user entity from among the end-user entities shown in FIG. 1) can list, using a UI associated with the Website/regulatory assistance application 200, all aspects of a corresponding industry or an organization that are relevant for regulations as 'functional constituents' and thereafter establish relationships across the functional constituents to form links. Accordingly, FIG. 5A shows a representation of the industry level construct 500 created by the user using the UI. The industry level construct 500 includes functional constituents represented as nodes 502, 504, 506, 508, 510, 512, 514 and 516 corresponding to 'Governing agencies', 'Processes', 'IT Systems', 'Clients, Vendors and Counterparties', 'Compliance', 'Teams and Roles', 'Functional Areas' and 'Products', respectively.

As can be seen, each functional constituent, i.e. each node, is connected through links with other functional constituents, i.e. other nodes. For example, a link 520 connects nodes 502 and 508. Similarly, a link 522 connects nodes 506 and 514. It is noted that each functional constituent (i.e. each node) may have deep nested structures under it. Moreover, each item within each nested structure may have a relationship with other items under other nested structures. For example, a node corresponding to 'financial products' may have a nested structure which includes a node at a lower hierarchical level corresponding to 'Brokering and dealing services for investment company securities', which in turn may include a node at a lower hierarchical level corresponding to 'Brokering and dealing services for open-end funds (for example, mutual funds)'.

FIG. 5B shows a representation of the organization level construct 550 created by a user (i.e. an end-user entity from among the end-user entities shown in FIG. 1) using a UI provided by the server system 150. In at least some embodiments, experts may use generic industry level models to build an organization specific construct, such as the organization level construct 550. This may be achieved by mapping the relationships amongst the organizational structure, processes and assets. The organization level construct 550 includes functional constituents represented as nodes 552, 554, 556, 558, 560, 562, 564 and 566 corresponding to 'Legal Entities', 'Processes', 'IT Systems', 'Money Movement', 'Compliance', 'Teams and Roles', 'Functional Areas' and 'Products', respectively. As can be seen, each functional constituent, i.e. each node is connected through links with other functional constituents, i.e. other nodes. For example, a link 570 connects nodes 552 and 558. Similarly, a link 572 connects nodes 556 and 564.

In at least one example embodiment, specific clauses from a regulation are linked to a specific node from 'industry level constructs' or 'organization level constructs'. Such links are referred to herein as 'strong links'. A strong link allows for a powerful, context-aware relationship between a regulation and the industry/organization level construct. The user can immediately identify a component such as a role or IT system within a company and correlate the regulations that impact that component. Moreover, as explained with reference to FIGS. 2 and 3, the server system 150 connects related regulation clauses, including subsequent versions of the same clause. Thus, an established 'strong link' also allows for immediate identification of subsequent versions, thereby keeping track of the latest version of the rules impacting a 'node element'. Such a scenario is depicted in FIGS. 6A and 6B.

Figure 6A:
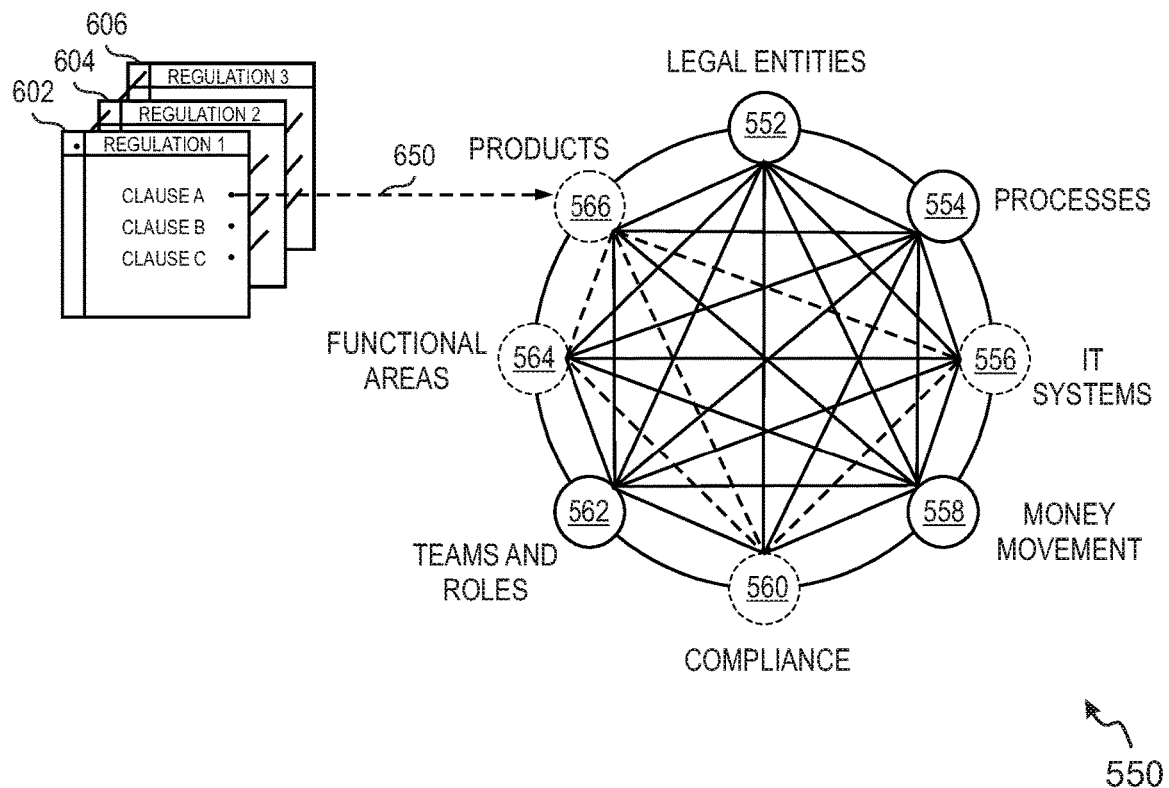
FIGS. 6A and 6B shows simplified representations of strong links connecting clauses of regulations to nodes in an organization level construct, in accordance with an example embodiment of the invention.
Figure 6B:
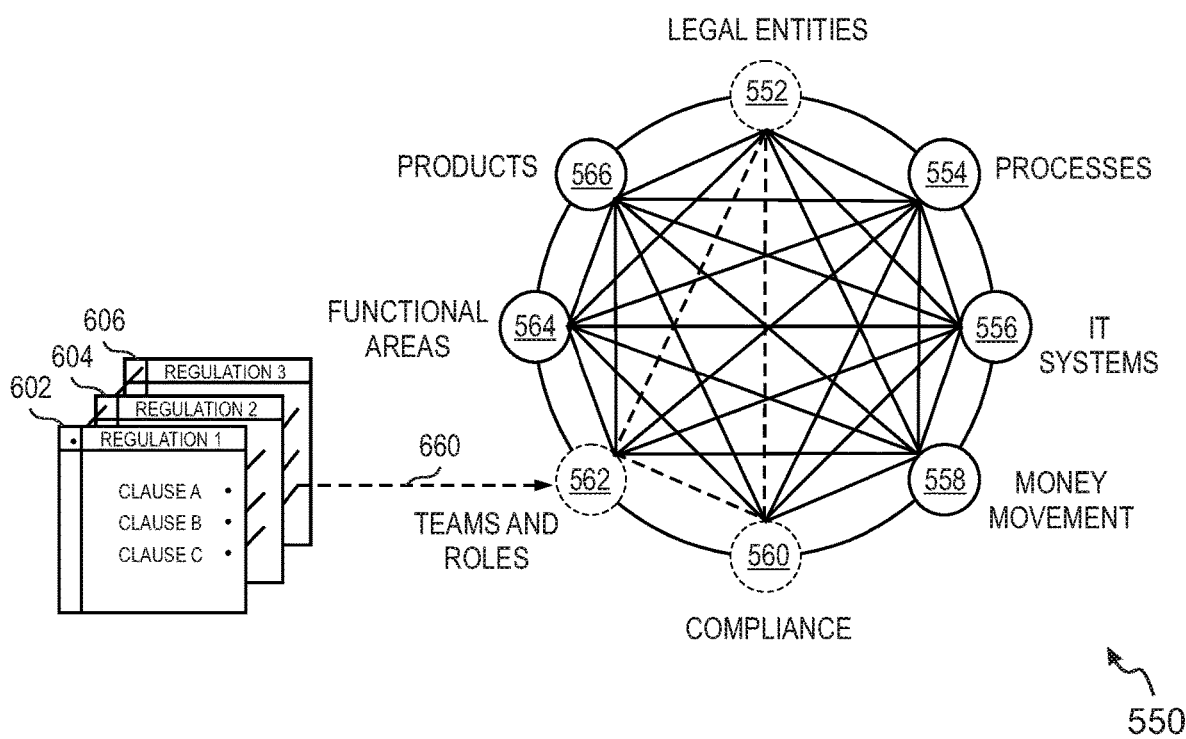

FIGS. 6A and 6B shows simplified representations of strong links connecting clauses of regulations to functional constituents in the organization level construct 550, in accordance with an example embodiment of the invention.

More specifically, the example representations show a plurality of regulations 602, 604 and 606 depicted as 'Regulation 1', 'Regulation 2' and 'Regulation 3'. Each regulation is associated with one or more clauses. For example, the regulation 602 is depicted to include three clauses for illustration purpose.

In FIG. 6A, a strong link 650 is depicted to be formed between clause A of the regulation 602 and the node 566 (i.e. functional constituent 'Products') of the organization level construct 550. Such creation of strong links may have different implications for organization level nodes and relationships as exemplarily depicted in FIG. 6A. The strong link 650 may have implications on nodes 556, 560 and 564 corresponding to aspects 'IT Systems', 'Compliance' and 'Functional areas', respectively, associated with the organization. Moreover, different regulatory clauses may impact parts of the organization differently, as shown in FIG. 6B.

In FIG. 6B, a strong link 660 is created between clause C of the regulation 606 and a node 562 corresponding to functional constituent 'Teams and roles' aspect of the organization. Such a strong link may impact other parts of the organization as depicted by nodes 552 and 560 corresponding to functional constituents 'Legal entities' and 'Compliance', respectively.

It is noted that currently, publishing platforms and GRC platforms do not tie the regulation to the industry level construct or company level construct down at a system level. The connection of regulations to the organization level construct as explained herein leads to lower costs for changes to regulations and the organization.

Figure 7A:
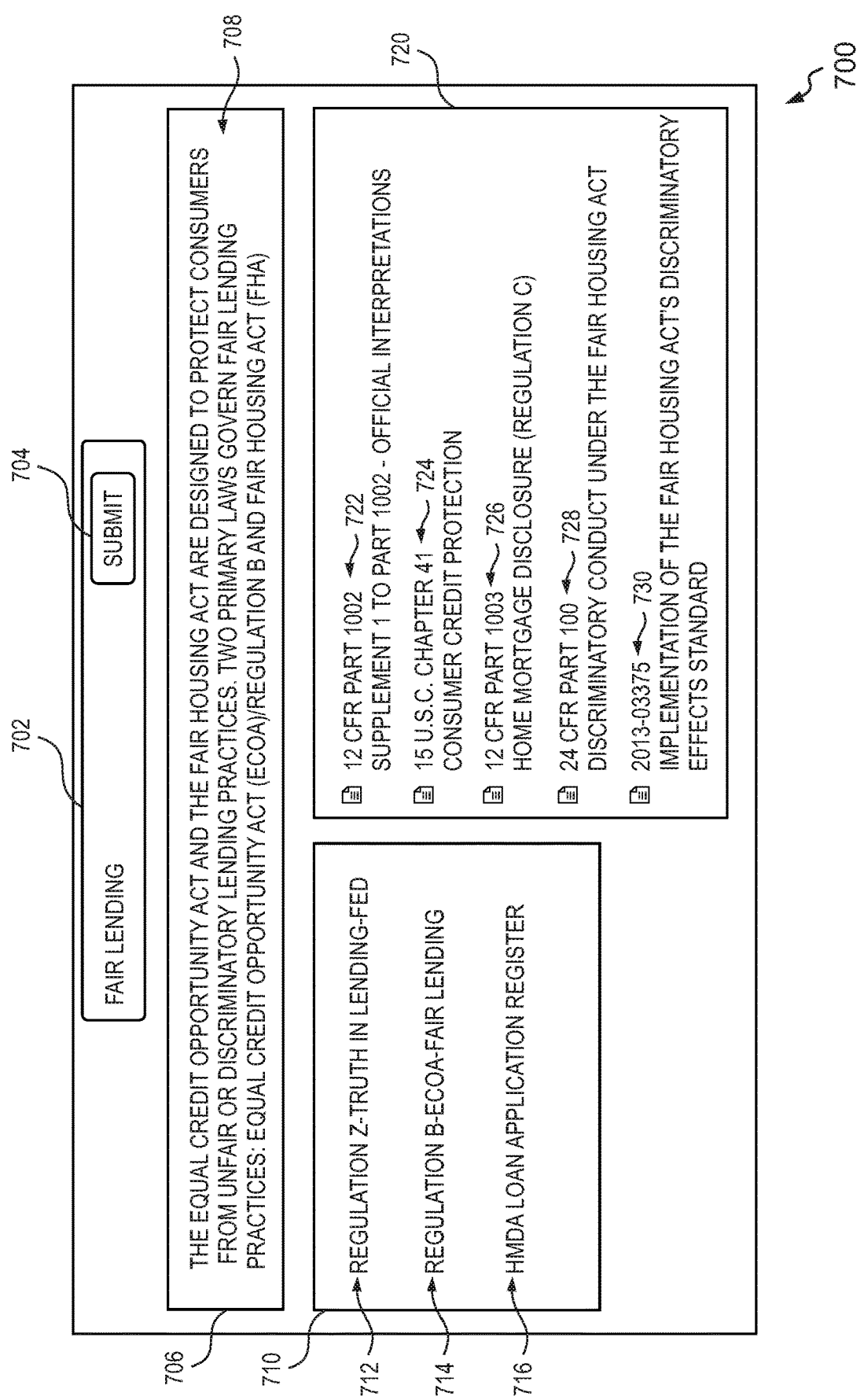
FIGS. 7A and 7B show simplified representations of UIs presented to a user by the server system of FIG. 1 for facilitating linking of clauses of a regulation to functional constituents of the organization level construct, in accordance with an example embodiment of the invention.
Figure 7B:
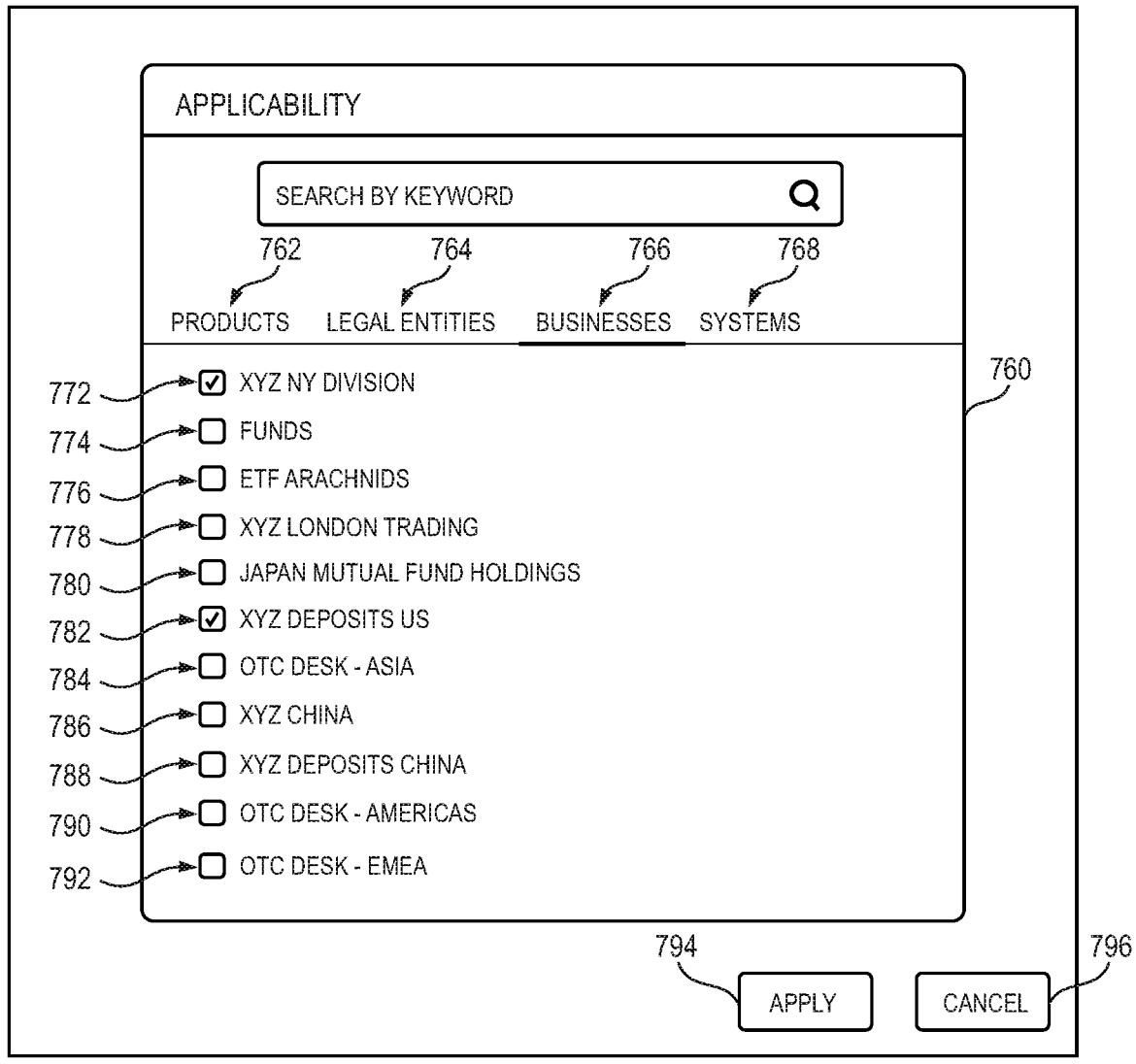

FIGS. 7A and 7B show simplified representations of UIs presented to a user by the server system 150 of FIG. 1 for facilitating linking of clauses of a regulation to functional constituents of an organization level construct, in accordance with an example embodiment of the invention. As an illustrative example, an organization XYZ offering financial products to its consumers may wish to identify applicable regulations related to 'Fair Lending' stipulated by the concerned regulatory authorities.

As explained with reference to FIG. 2, the server system 150 may be associated with a Website or the regulatory assistance application 200 including UIs capable of assisting users with discovery of regulations, collaboration on the regulations with other users, creation of industry/organization constructs and connection of appropriate regulations to the industry/organization constructs. One such UI associated with the Website (or the regulatory assistance application 200) capable of facilitating connection of appropriate regulation clauses to a functional constituent of an organization level construct is shown as a UI 700 in FIG. 7A.

The UI 700 depicts a search box 702 capable of receiving user input. The user is exemplarily depicted to have typed 'FAIR LENDING' in the search box 702 and select a submit option 704 located within the search box 702. The UI 700 further depicts a portion 706 providing a brief abstract 708 of regulations applicable to the user input 'Fair Lending'. The brief abstract 708 is depicted to be associated with text: 'THE EQUAL CREDIT OPPORTUNITY ACT AND THE FAIR HOUSING ACT ARE DESIGNED TO PROTECT CONSUMERS FROM UNFAIR OR DISCRIMINATORY LENDING PRACTICES. TWO PRIMARY LAWS GOVERN FAIR LENDING PRACTICES: EQUAL CREDIT OPPORTUNITY ACT (ECOA)/REGULATION B AND FAIR HOUSING ACT (FHA)'.

The UI 700 further depicts a section 710 including a list of regulations that are related to fair lending. More specifically, the section 710 depicts three regulations 712, 714 and 716 associated with text 'REGULATION Z-TRUTH IN LENDING-FED', 'REGULATION B-ECOA-FAIR-LENDING', and HDMA LOAN APPLICATION REGISTER', respectively. The UI 700 further depicts a section 720 including requirements within the regulations, or in other words, clauses within regulations that are applicable to the products and business units of an organization (for example, Organization XYZ). Accordingly, the section 720 shows applicable requirements within regulation B/ECOA in form of clauses 722, 724, 726, 728 and 730. The user may provide a selection input on a requirement, such as a requirement 722, shown in the section 720. It is noted that each regulation and its associated clauses are enriched with context as explained with reference to FIGS. 2 and 3. In at least some example embodiments, a UI such as a UI 750 shown in FIG. 7B may be displayed to the user upon selection of the requirement 722 on the UI 700.

Referring now to FIG. 7B, the UI 750 may be configured to display a listing of all requirements associated with Regulation B/ECOA—Fair Lending (not shown in FIG. 7B), along with the requirement 722. The UI 750 further depicts a pop-up 760 displaying four functional constituents 762, 764, 766 and 768 of the organization XYZ associated with text 'PRODUCTS', 'LEGAL ENTITIES', 'BUSINESSES' AND 'SYSTEMS', respectively. As an illustrative example, the functional constituent 766, i.e. 'BUSINESSES', is depicted to be selected by the user. The pop-up 760 further depicts a plurality of sub-nodes within the functional constituent 'Businesses', such as sub-nodes 772, 774, 776, 778, 780, 782, 784, 786, 788, 790 and 792. Each sub-node is associated with a user selectable option. In at least one example embodiment, the server system 150 may suggest selections of businesses which are relevant to the Regulation B and to the specific clause, i.e. requirement 722 of the regulation B. Accordingly, two businesses 'XYZ NY Division' and 'XYZ Deposits US' are relevant to the Fair Lending regulatory requirement. In some embodiments, the user may attempt to better understand the Fair Lending related regulatory requirement by reviewing the context aware regulations and also collaborating with other users and reading expert commentaries, blogs and research articles related to such a requirement. The user may provide additional selections of sub-nodes based on the understanding of the regulatory requirement. Subsequent to the selections, the user may select an option 794 associated with text 'APPLY' to link the requirement (i.e. clauses) within the regulation to the functional constituent of the organization (i.e. specific businesses). Similarly, the user may link other nodes and sub-nodes with requirements within the regulations to complete the linking process. The UI 750 further depicts an option 796 associated with text 'CANCEL' and the selection of the option 796 may revert the user to the UI 700 shown in FIG. 7A.

The identification of all applicable regulations and linking of granular clauses of the regulations to granular constituents of the organization/industry enables the user to understand the full impact of the applicable regulations and facilitates implementation of applicable regulations. In some embodiments, the server system 150 may be configured to identify and extract references of applicable regulations to other regulations and relationships there between. In at least one embodiment, depending on the references and their relationships, users are alerted of the impact of a new regulation. In some embodiments, if the requirements within any regulation undergo a change, the new requirements may automatically be mapped to the functional constituents of the organization or industry level constructs to facilitate implementation of the applicable regulations. For example, if a new regulation (or a requirement within an existing regulation) is introduced, then the server system 150 may be configured to source the regulation from the corresponding data store and enrich the regulation with context. The server system 150 may also determine if the enriched regulation is related to other regulations and accordingly update references and corresponding relationships. For a user, who has created industry and organization constructs, such references and relationships of the mapped regulations may be updated, and the user may be able to determine the impact of the new regulation or a new requirement within an existing regulation without any manual intervention.

The facilitating of implementation of regulations is further explained with reference to a sequence flow in FIG. 8.

Figure 8:
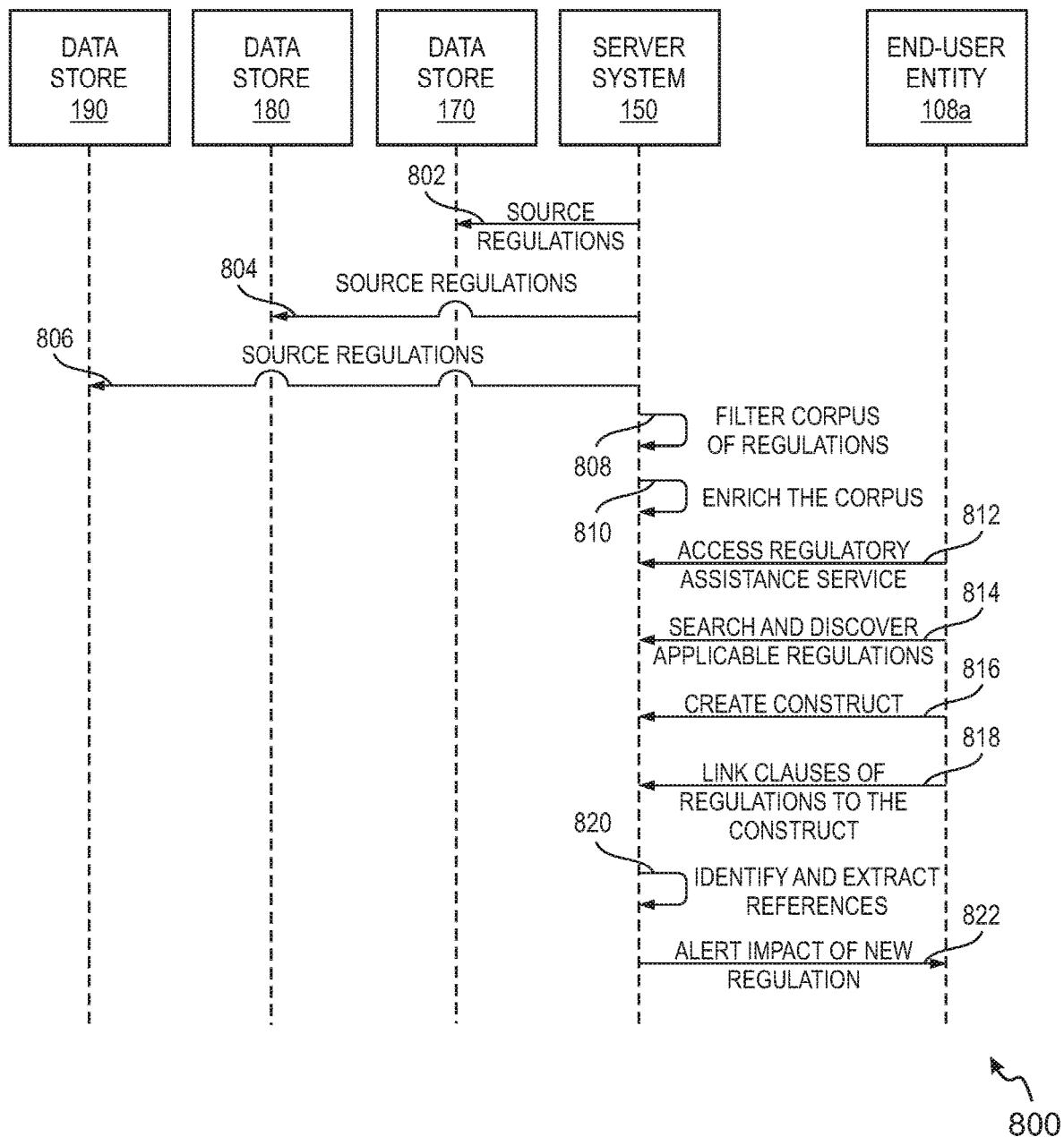
FIG. 8 shows a representation of a sequence flow for illustrating facilitating implementation of regulations by an organization, in accordance with an example embodiment of the invention.

Referring now to FIG. 8, a representation of a sequence flow 800 is shown for illustrating facilitating implementation of regulations by an organization, in accordance with an example embodiment of the invention. The organization is depicted as an end-user entity 108a in FIG. 8.

The sequence flow 800 starts at 802. At 802, the server system 150 sources regulations from a data store 170. At 804, the server system 150 sources regulations from a data store 180. At 806, the server system 150 sources regulations from a data store 190. As explained with reference to FIG. 1, the server system 150 sources regulations from data stores related to a plurality of regulatory authorities. Accordingly, the data stores 170, 180 and 190 may correspond to Web servers/Cloud Storage/Network storage or any public or private database storing regulations related to variety of regulatory authorities. The sourced regulations from the data stores 170, 180 and 190 configure a corpus of regulations.

At 808, the server system 150 performs filtering of the corpus of regulations.

At 810, the server system 150 performs enrichment of the corpus of regulations to generate of plurality of enriched regulations.

The filtering and enrichment of the corpus of regulations may be performed as explained with reference to FIG. 3 and is not explained herein.

At 812, an end-user entity 108a accesses the server system 150 over a communication network, such as the network 110 shown in FIG. 1. As explained with reference to FIG. 2, the server system 150 extends regulatory assistance as a Web service, and accordingly may provide access to the service using a Web portal or the regulatory assistance application 200. The end-user entity 108a may sign up for the service and create an account to consume the regulatory assistance service offered by the server system 150. Accordingly, at 812, the end-user entity 108a may access a UI of the Web portal or the regulatory assistance application 200 associated with the server system 150.

At 814, the end-user entity 108a may search and discover regulations applicable to at least one of industry or an organization. The search and discovery of regulations is explained with reference to FIG. 4.

At 816, the end-user entity 108a creates a construct related to at least one of the industry or the organization using the UIs of the Web portal or the regulatory assistance application 200 associated with the server system 150.

At 818, the end-user entity 108a links clauses of at least one enriched regulation to functional constituents of the construct. The linking of context-aware regulation clauses to businesses and products of an organization, enables the end-user entity 108a to understand the regulatory environment applicable to the organization and take appropriate steps, thereby facilitating implementation of regulations by the end-user entity 108a.

At 820, the server system 150 identifies and extracts references and relationships to other regulations.

At 822, depending on the references and their relationships, the server system 150 alerts the end-user entity 108a of an impact of a new regulation. The sequence flow 800 ends at 822.

Referring back to FIG. 2, in at least one example embodiment, the server system 150 may be configured to store individual regulations that are decomposed, parsed and enriched with context, where the context is related the same regulation, in the database 210. Further, the server system 150 may also be configured to store a set of multiple regulations that have been decomposed, parsed and enriched, where those regulations and relationships across those regulations are stored.

In some embodiments, the server system 150 is configured to generate at least one bundled packet of applicable regulations for use by users associated with a type of industry or a type of an organization. The bundled packet of applicable regulations includes manually verified and modified context-aware regulations related to the type of industry (for example, financial industry, banking industry etc.) or the type of organization (for example, a consumer durables business enterprise or an airline service enterprise). The bundled packet of applicable regulations is also referred to herein as 'regulation applicability content packets'. The term 'regulation applicability content packets' refers to a context-aware packet of data, that has been manually verified, confirmed, and saved by an individual. In one embodiment, the server system 150 facilitates creation, distribution and sale of 'regulation applicability content packets', where each packet has multiple applicability dimensions such as jurisdiction, industry, company, business unit or product/service, and the like. Such a packet provides context to a regulation, and such an applicability packet differs from stored computer-generated individual regulations or set of multiple regulations, in that an individual user has confirmed its contents and may have even modified it. The regulation applicability content packet is further explained using a following illustrative example:

In an example scenario, a regulation related to fund administration may have been implemented for two organizations. One organization may have a corresponding organization level construct 'Fund Administrator ABC', while the second organization may have an organization level construct 'Fund Administrator 123'. Any clauses within the regulation that apply to fund administration related tasks may have to be tagged for 'Fund Administrator ABC' or 'Fund Administrator 123'. Thus, one applicability packet which is for first organization may be created for construct 'Fund Administrator ABC' along with the specific regulation clauses/phrases that apply to Fund Administrators. Another applicability packet may be created for second organization for construct 'Fund Administrator 123' for the same exact regulation clauses/phrases. As can be seen from the above example, same exact regulation with two different applicability packets, but at the organization level can be created, distributed and sold.

Figure 9:
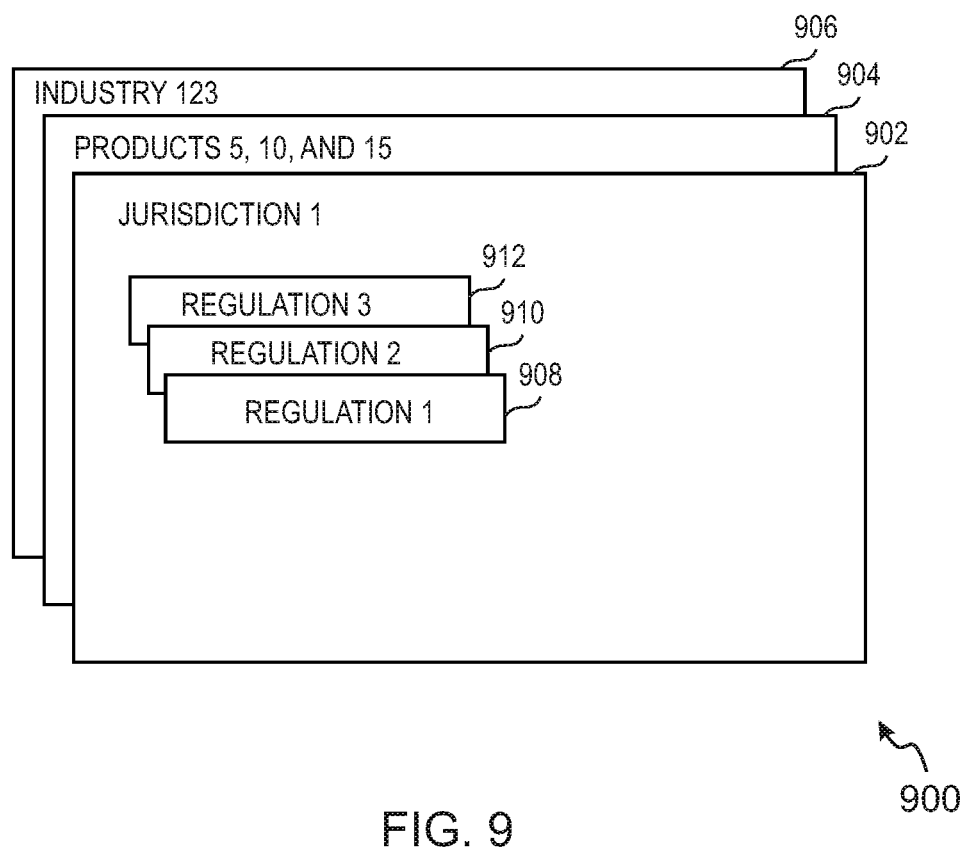
FIG. 9 shows a simplified representation of a regulation applicability content packet, in accordance with an example embodiment of the invention.

FIG. 9 shows an example representation of a regulation applicability content packet 900, in accordance with an example embodiment of the invention. As explained above, regulation applicability content packet is a context-aware packet of data, that has been manually verified, confirmed, and saved by an individual and such a packet provides context to a regulation. As can be seen, the regulation applicability content packet 900 is associated with multiple dimensions such as jurisdiction 902, products 904 and industry 906. In some embodiments, the dimensions may also include company, business unit or product/service, and the like. Each packet is associated with one or more regulations. For example, the dimension for jurisdiction 902 is depicted to be associated with regulations 908, 910 and 912. Each of these regulations are decomposed and enriched as explained with reference to FIG. 3. These regulations may be applicable for products 5, 10 and 15 and industry 123, as exemplarily depicted in FIG. 9.

Figure 10:
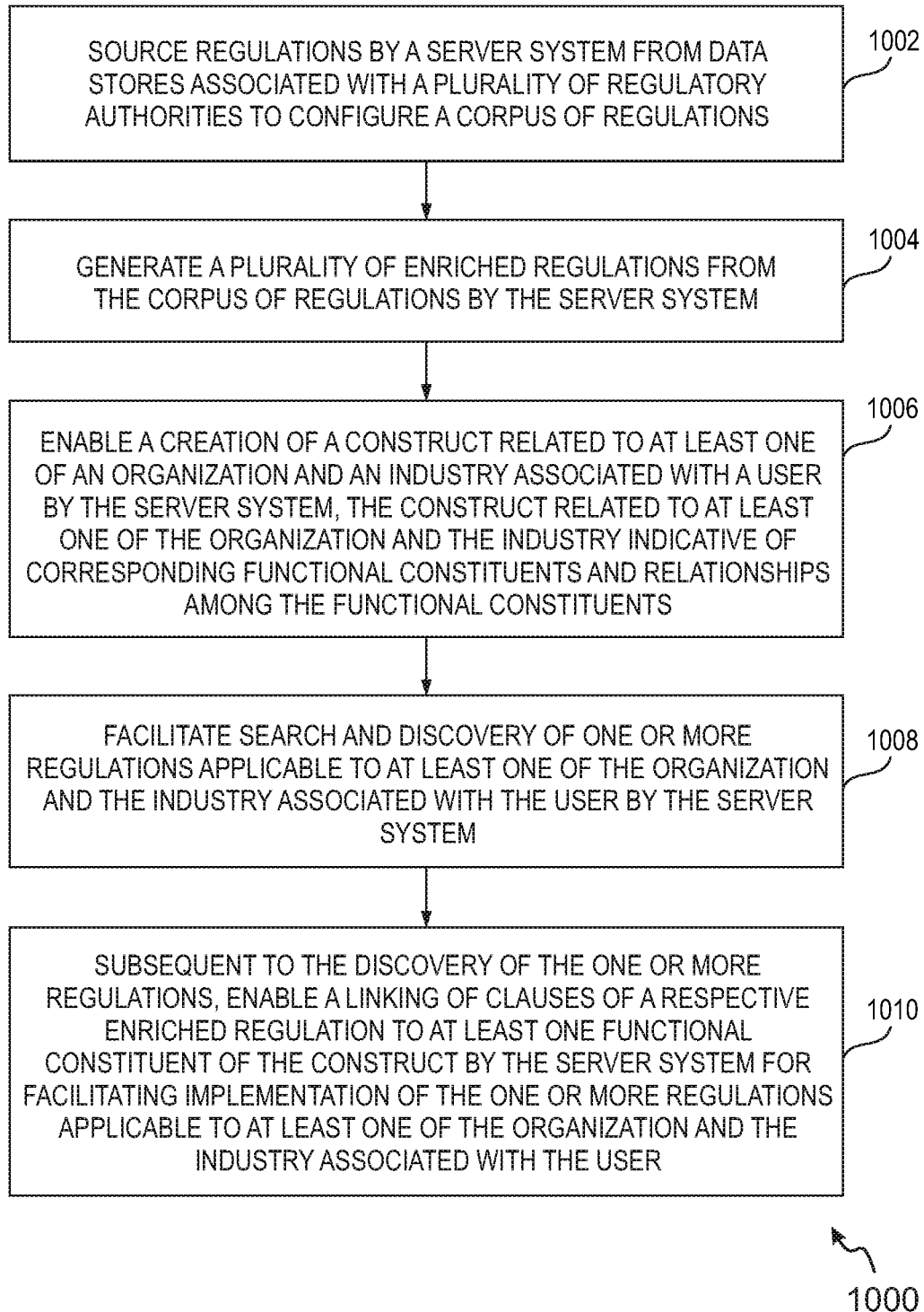
FIG. 10 is a flow diagram of a method for facilitating implementation of regulations by an organization, in accordance with an example embodiment of the invention.

FIG. 10 is a flow diagram of a method 1000 for facilitating implementation of regulations by an organization, in accordance with an example embodiment of the invention. The various steps and/or operations of the flow diagram, and combinations of steps/operations in the flow diagram, may be implemented by, for example, hardware, firmware, a processor, circuitry and/or by the server system 150 of the present technology and/or by a different device associated with the execution of software that includes one or more computer program instructions. The method 1000 starts at operation 1002.

At 1002, regulations from data stores associated with a plurality of regulatory authorities are sourced by a server system to configure a corpus of regulations. For example, a large number of regulations may be extracted from network entities, such as Web servers and other public and private data stores storing regulations put forth by various regulatory authorities. In an illustrative example, the server system may download a one-time corpus of regulations from various U.S. government Websites and update the corpus of regulations daily or quarterly, as available. It is noted the regulations are downloaded only subsequent to their appropriate copyright and legal review ensuring no copyright or legal boundaries are violated.

At 1004, a plurality of enriched regulations is generated from the corpus of regulations by the server system. An enriched regulation is generated by parsing a regulation from the corpus of regulations and associating parsed components of the regulation with relevant context. In an embodiment, the server system may include a unified model, such as the unified model 250 explained with reference to FIGS. 2 and 3. The unified model is associated with proprietary Natural Language Processing (NLP) and Artificial Intelligence (AI) algorithms to pre-process or 'filter' the corpus of regulations. Further, the unified model is associated with another set of rules and algorithms configured to 'enrich' the corpus or, in other words, to add deeper context to the filtered corpus of regulations. The 'filtering' and the 'enrichment' of the corpus of the regulations using the unified model may be performed as explained with reference to FIG. 3 and is not explained again herein.

At 1006, a creation of a construct related to at least one of an organization and an industry associated with a user is enabled by the server system. The construct related to at least one of the organization and the industry is indicative of corresponding functional constituents and relationships among the functional constituents. The construct related to at least one of an organization and an industry associated with the user and their respective creation using UIs offered by the server system is explained with reference to FIGS. 5A and 5B and is not explained again herein.

At 1008, search and discovery of one or more regulations applicable to at least one of the organization and the industry associated with the user is facilitated by the server system. The search and discovery of regulations is explained with reference to FIG. 4.

Subsequent to the discovery of the one or more regulations, at 1010, a linking of clauses of a respective enriched regulation to at least one functional constituent of the construct is facilitated by the server system for enabling implementation of the one or more regulations applicable to at least one of the organization and the industry associated with the user. The linking of clauses of enriched regulations to functional constituents of the construct may be performed as explained with reference to FIGS. 6A, 6B, 7A and 7B. The method 1000 ends at 1010.

Figure 11:
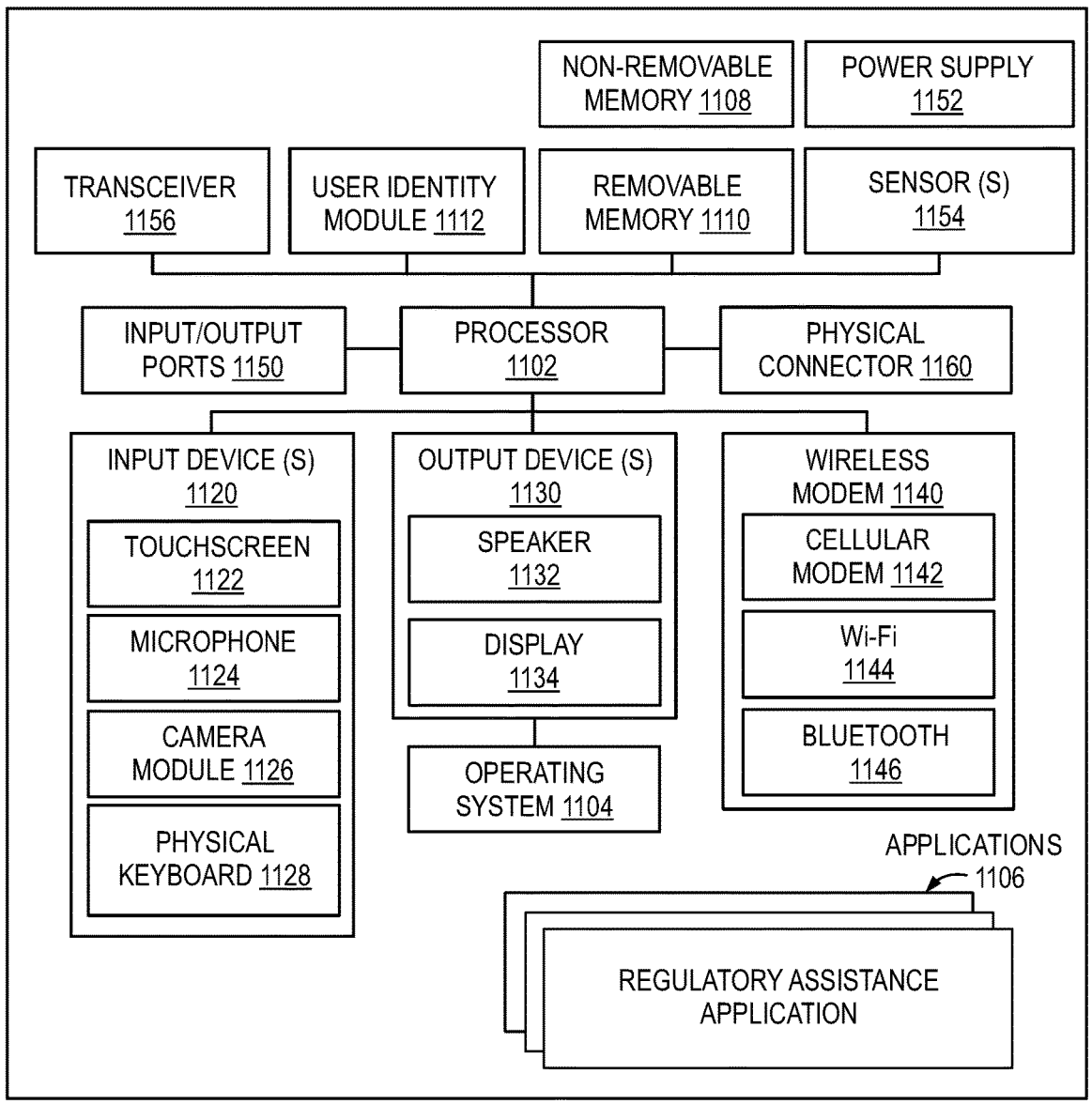
FIG. 11 shows a simplified block diagram of an electronic device, in accordance with an example embodiment of the invention.

FIG. 11 illustrates an electronic device 1100 capable of implementing the various embodiments of the present invention. In an embodiment, the various operations performed by the server system 150 may be implemented using an application in an electronic device, such as the electronic device 1100. For example, the electronic device 1100 may correspond to a device corresponding to a user, such as for example, an organizational user tasked with the implementation of the regulations for the organization. The electronic device 1100 is depicted to include one or more applications 1106, including a regulatory assistance application, which serves as an instance of the application downloaded from the server system 150 and which is capable of communicating through API calls with the server system 150 to facilitate implementation of the regulations by the end-user entity.

It should be understood that the electronic device 1100 as illustrated and hereinafter described is merely illustrative of one type of device and should not be taken to limit the scope of the embodiments. As such, it should be appreciated that at least some of the components described below in connection with the electronic device 1100 may be optional and thus in an example embodiment may include more, less or different components than those described in connection with the example embodiment of the FIG. 11. As such, among other examples, that the electronic device 1100 could be any of mobile electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the electronic device 1100 and support for one or more applications programs (see, applications 1106), such as the regulatory assistance application, that implements one or more of the innovative features described herein. In addition to the regulatory assistance application, the applications 1106 may include common mobile computing applications (e.g., telephony applications, email applications, calendars, contact managers, web browsers, messaging applications) or any other computing application. The regulatory assistance application, in at least one example embodiment, may be configured to present one or more UIs to facilitate discovery of regulations, collaboration on the regulations with other users, creation of industry/company level constructs and connection of appropriate regulations to the functional constituents of the industry/company level constructs.

The illustrated electronic device 1100 includes one or more memory components, for example, a non-removable memory 1108 and/or a removable memory 1110. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104 and the applications 1106. The electronic device 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1100 can support one or more input devices 1120 and one or more output devices 1130. Examples of the input devices 1120 may include, but are not limited to, a touch screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include but are not limited to a speaker 1132 and a display 1134. Other possible output devices (not shown in the FIG. 11) can include piezoelectric or other haptic output devices. Some devices can serve more than one input/output function. For example, the touch screen 1122 and the display 1134 can be combined into a single input/output device.

A wireless modem 1140 can be coupled to one or more antennas (not shown in the FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the electronic device 1100 and a public switched telephone network (PSTN).

The electronic device 1100 can further include one or more input/output ports 1150, a power supply 1152, one or more sensors 1154 for example, an accelerometer, a gyroscope, a compass, or an infrared proximity sensor for detecting the orientation or motion of the electronic device 1100, a transceiver 1156 (for wirelessly transmitting analog or digital signals) and/or a physical connector 1160, which can be a USB port, IEEE 1294 (FireWire) port, and/or RS-232 port. The illustrated components are not required or all-inclusive, as any of the components shown can be deleted and other components can be added.

Various embodiments of the present technology provide a method and system (for example, the server system 150 explained with reference to FIGS. 1 to 9) for facilitating implementation of regulations by organizations. The techniques described herein provide a regulation tracking and compliance system that aims to standardize many fragmented regulatory compliance cottage industries across various sectors. Moreover, it provides a unified model to store and represent regulations and their applicability, regardless of the jurisdiction, regulatory agency or industry sector. The techniques disclosed herein connect discovery to collaboration to applicability on a single platform. Moreover, the users can find a diverse set of regulations all in one location and also view annotations for a regulation. The users can collaborate and build consensus on a regulation by asking questions or discussing with the community. In some embodiments, the users may even hold private discussions with a smaller group and bookmark an agency or regulation to your "favorites" for easy future reference and updates tracking. The collaboration model allows for communities of experts and non-experts to quickly gain knowledge and build consensus. Moreover, the computer based self-learning algorithms are designed to improve the overall results and reduce erroneous outputs over time.

Furthermore, the techniques disclosed herein enable documenting the structure of an industry or company in the context of regulatory compliance and thereafter for connecting regulations to an industry, company, business unit or product/service. Moreover, the techniques suggested herein provide for transfer of knowledge in the form of ready-made "projects" that can be quickly customized for a company's specific scenarios.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems (such as the server system 150) and methods may be embodied using transistors, logic gates, and electrical circuits (for example, application specific integrated circuit (ASIC) circuitry and/or in Digital Signal Processor (DSP) circuitry).

Particularly, the server system 150 and its various components, such as the computer system 205, the database 210, the processing module 215, the memory 220, the communication interface 225 and the storage interface 230 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations (for example, operations explained herein with reference to FIG. 10). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:
1. A computer-implemented method, comprising:
  receiving, by a server system, regulation content from data stores associated with a plurality of regulatory authorities;
  configuring a corpus of regulations based at least in part on the received regulation content;
  generating, by the server system, a plurality of enriched regulations from the corpus of regulation content, each enriched regulation generated by parsing respective components of regulation content and associating the parsed components with relevant context;

receiving, by the server system, a first construct related to a first organization;

receiving, by the server system, a second construct related to a second organization, each respective construct associated with a particular user account and an industry associated with the particular user account,
- (i) the first construct defined according to a plurality of different functional constituent nodes ("nodes") associated with the first organization; and
- (ii) the second construct defined according to a plurality of different functional constituent nodes ("nodes") associated with the second organization;

identifying, by the server system, one or more enriched regulations applicable to the first and the second organizations;

generating, by the server system, a first mapping link between a clause in a first identified enriched regulation and a first node of the first construct;

generating, by the server system, a second mapping link between the same clause in the first identified enriched regulation and a first node of the second construct, wherein the first node of the first construct represents a different type of functional constituent than the first node of the second construct;

receiving, by the server system, updated regulation content from one or more of the data stores that corresponds with the clause of the first identified enriched regulation;

mapping, by the server system, the updated regulation content to the first construct via the first mapping link;

mapping, by the server system, the updated regulation content to the second construct via the second mapping link; and generating, by the server system, a regulation alert for a first user account associated with the first organization and a second user account associated with the second organization, wherein generating the regulation alert comprises: generating a respective regulation alert for each of the first and the second user accounts based on receipt of the updated regulation content.

2. The method as claimed in claim 1, further comprising:
performing, by the server system, filtering of the corpus of regulation content using a plurality of filter arrays prior to generating the plurality of enriched regulations, each filter array from among the plurality of filter arrays associated with one or more natural language processing (NLP) and artificial intelligence (AI) algorithms configured to perform at least one pre-processing operation on the corpus of regulations, wherein a pre-processing operation from among the at least one pre-processing operation corresponds to normalization of the corpus of regulations.

3. The method as claimed in claim 1, further comprising:
enabling a respective user account, by the server system, to add annotations to at least one enriched regulation from among the plurality of enriched regulations.

4. The method as claimed in claim 1, further comprising:
receiving from one or more respective user account, by the server system, collaboration data associated collaboration activity with one or more other user accounts, the collaboration activity facilitating understanding of the one or more regulations applicable to one or more respective nodes of respective constructs associated with organizations that correspond with the collaborating user accounts.

5. The method as claimed in claim 4, wherein the collaboration activity includes sharing of information relevant to the understanding of the one or more regulations, and wherein the information comprises at least one of research articles, blogs, expert commentary, customized datasets, one or more enriched regulations and annotations.

6. The method as claimed in claim 5, wherein the information is shared by one or more respective user accounts associated with a subscription fee.

7. The method as claimed in claim 1, further comprising:
tracking, by the server system, content of relevance to a respective user account, wherein the content of relevance is determined based on one of a user account input and learning based on one or more user account actions.

8. The method as claimed in claim 1, further comprising:
generating, by the server system, at least one bundled packet of applicable regulations for use by user accounts associated with a type of industry or a type of an organization, the bundled packet of applicable regulations comprising manually verified and modified context-aware regulations related to the type of industry or the type of organization.

9. The method as claimed in claim 1, further comprising:
identifying for each regulation from among the one or more regulations, by the server system, references to other regulations from among the plurality of enriched regulations and corresponding relationships between each regulation and the referenced other regulations; and facilitating, by the server system, determination of an impact of a new regulation based on the discovered one or more regulations and the corresponding relationships between each regulation from among the one or more regulations and the referenced other regulations.

10. A server system comprising:
at least one processing module; and
a memory having stored therein machine executable instructions, that when executed by the at least one processing module, cause the server system to:
receive regulation content from data stores associated with a plurality of regulatory authorities;
configure a corpus of regulations based at least in part on the received regulation content;
generate a plurality of enriched regulations from the corpus of regulation content, each enriched regulation generated by parsing respective components of regulation content and associating the parsed components with relevant context;
receive a first construct related to a first organization;
receiving a second construct related to a second organization, each respective construct associated with a particular user account and an industry associated with the particular user account,
- (i) the first construct defined according to a plurality of different functional constituent nodes ("nodes") associated with the first organization; and
- (ii) the second construct defined according to a plurality of different functional constituent nodes ("nodes") associated with the second organization;

identify one or more enriched regulations applicable to the first and the second organization; and generate a first mapping link between a clause in a first identified enriched regulation and a first node of the first construct;

generate a second mapping link between the same clause in the first identified enriched regulation and a first node of the second construct, wherein the first node of the first construct represents a different type of functional constituent than the first node of the second construct;

receive updated regulation content from one or more of the data stores that corresponds with the clause of the first identified enriched regulation;

map the updated regulation content to the first construct via the first mapping link;

map the updated regulation content to the second construct via to the second mapping link; and generate a regulation alert for a first user account associated with the first organization and a second user account associated with the second organization, wherein generate the regulation alert comprises: generate a respective regulation alert for each of the first and the second user accounts based on receipt of the updated regulation content.

11. The server system as claimed in claim 10, wherein the server system is further caused to:

perform filtering of the corpus of regulation content using a plurality of filter arrays prior to generating the plurality of enriched regulations, each filter array from among the plurality of filter arrays associated with one or more natural language processing (NLP) and artificial intelligence (AI) algorithms configured to perform at least one pre-processing operation on the corpus of regulations.

12. The server system as claimed in claim 10, wherein the server system is further caused to:

enable a respective user account to add annotations to at least one enriched regulation from among the plurality of enriched regulations.

13. The server system as claimed in claim 10, wherein the server system is further caused to:

receive from one or more respective user account collaboration data associated with collaboration activity with one or more other user accounts, the collaboration activity facilitating understanding of the one or more regulations applicable to one or more respective nodes of respective constructs associated with organizations that correspond with the collaborating user accounts.

14. The server system as claimed in claim 13, wherein the collaboration activity includes sharing of information relevant to the understanding of the one or more regulations, and wherein the information comprises at least one of research articles, blogs, expert commentary, customized datasets, one or more enriched regulations and annotations.

15. The server system as claimed in claim 10, wherein the server system is further caused to:

track content of relevance to the respective user account, wherein the content of relevance to a respective user account is determined based on one of a user account input and learning based on one or more user account actions.

16. The server system as claimed in claim 10, wherein the server system is further caused to:

generate at least one bundled packet of applicable regulations associated with a type of industry or a type of an organization, the bundled packet of applicable regulations comprising manually verified and modified context-aware regulations related to the type of industry or the type of organization.

17. The server system as claimed in claim 10, wherein the server system is further caused to:

identify for each regulation from among the one or more regulations references to other regulations from among the plurality of enriched regulations and corresponding relationships between each regulation and the referenced other regulations; and facilitate determination of an impact of a new regulation based on the discovered one or more regulations and the corresponding relationships between each regulation from among the one or more regulations and the referenced other regulations.

18. A computer program product comprising at least one non-transitory computer-readable storage medium, the at least one non-transitory computer-readable storage medium comprising a set of instructions, which, when executed by one or more processors, cause an electronic device to at least perform:

receive regulation content from data stores associated with a plurality of regulatory authorities;

configure a corpus of regulations based at least in part on the received regulation content;

generate a plurality of enriched regulations from the corpus of regulation content, each enriched regulation generated by parsing respective components of regulation content and associating the parsed components with relevant context;

receive a first construct related to a first organization;

receiving a second construct related to a second organization, each respective construct associated with a particular user account and an industry associated with the particular user account,
  (i) the first construct defined according to a plurality of different functional constituent nodes ("nodes") associated with the first organization; and
  (ii) the second construct defined according to a plurality of different functional constituent nodes ("nodes") associated with the second organization;

identify one or more enriched regulations applicable to the first and the second organization; and generate a first mapping link between a clause in a first identified enriched regulation and a first node of the first construct;

generate a second mapping link between the same clause in the first identified enriched regulation and a first node of the second construct, wherein the first node of the first construct represents a different type of functional constituent than the first node of the second construct;

receive updated regulation content from one or more of the data stores that corresponds with the clause of the first identified enriched regulation;

map the updated regulation content to the first construct via the first mapping link;

map the updated regulation content to the second construct via to the second mapping link; and generate a regulation alert for a first user account associated with the first organization and a second user account associated with the second organization, wherein generate the regulation alert comprises: generate a respective regulation alert for each of the first and the second user accounts based on receipt of the updated regulation content.

19. The computer program product as claimed in claim 18, wherein the electronic device is caused to:

receive from one or more respective user account collaboration data associated with collaboration activity with one or more other user accounts, the collaboration activity facilitating understanding of the one or more regulations applicable to one or more respective nodes of respective constructs associated with organizations that correspond with the collaborating user accounts;

wherein the collaboration activity includes sharing of information relevant to the understanding of the one or more regulations, and wherein the information comprises at least one of research articles, blogs, expert commentary, customized datasets, one or more enriched regulations and annotations.

* * * * *